(12) United States Patent
Nauka et al.

(10) Patent No.: US 11,787,108 B2
(45) Date of Patent: Oct. 17, 2023

(54) THREE-DIMENSIONAL PRINTING

(71) Applicant: HEWLETT-PACKARD DEVELOPMENT COMPANY, L.P., Spring, TX (US)

(72) Inventors: Krzysztof Nauka, Palo Alto, CA (US); Christopher Paul Schodin, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/418,414

(22) PCT Filed: Jan. 9, 2019

(86) PCT No.: PCT/US2019/013077
§ 371 (c)(1),
(2) Date: Jun. 25, 2021

(87) PCT Pub. No.: WO2020/145980
PCT Pub. Date: Jul. 16, 2020

(65) Prior Publication Data
US 2022/0055295 A1  Feb. 24, 2022

(51) Int. Cl.
| | |
|---|---|
| *B29C 64/165* | (2017.01) |
| *B33Y 10/00* | (2015.01) |
| *B29C 64/282* | (2017.01) |
| *B29C 64/209* | (2017.01) |
| *B29C 64/273* | (2017.01) |
| *B33Y 70/10* | (2020.01) |

(52) U.S. Cl.
CPC .......... *B29C 64/165* (2017.08); *B29C 64/209* (2017.08); *B29C 64/273* (2017.08); *B29C 64/282* (2017.08); *B33Y 10/00* (2014.12); *B33Y 70/10* (2020.01)

(58) Field of Classification Search
CPC ..... B29C 64/153; B29C 64/165; B22F 10/14; B22F 10/28
See application file for complete search history.

(56) References Cited

U.S. PATENT DOCUMENTS

| | | | |
|---|---|---|---|
| 8,425,816 B2* | 4/2013 | Okamoto | B33Y 10/00 264/109 |
| 10,730,235 B2* | 8/2020 | Okamoto | B29C 64/165 |
| 2004/0255841 A1 | 12/2004 | Enokido et al. | |
| 2007/0238056 A1 | 10/2007 | Baumann et al. | |
| 2016/0332374 A1* | 11/2016 | Nauka | B29C 64/393 |
| 2016/0332384 A1 | 11/2016 | De Pena | |

(Continued)

FOREIGN PATENT DOCUMENTS

| | | |
|---|---|---|
| CN | 104959613 A | 10/2015 |
| CN | 105057665 A | 11/2015 |

(Continued)

*Primary Examiner* — Mary Lynn F Theisen
(74) *Attorney, Agent, or Firm* — Dierker & Kavanaugh, P.C.

(57) ABSTRACT

In an example of a method for three-dimensional (3D) printing, one or more dispersions is/are sprayed to form a layer including build material particles and a liquid agent. The liquid agent is evaporated from the layer to form a build material layer, and based on a 3D object model, a binder agent is applied on at least a portion of the build material layer.

6 Claims, 8 Drawing Sheets

(56) References Cited

U.S. PATENT DOCUMENTS

| | | |
|---|---|---|
| 2016/0379851 A1 | 12/2016 | Swaminathan et al. |
| 2017/0008082 A1 | 1/2017 | Chen |
| 2017/0145224 A1 | 5/2017 | Hardin et al. |
| 2017/0157852 A1 | 6/2017 | Ederer et al. |
| 2018/0257300 A1 | 9/2018 | Ng et al. |
| 2020/0047252 A1 * | 2/2020 | Kritchman ............ B29C 64/336 |

FOREIGN PATENT DOCUMENTS

| | | |
|---|---|---|
| CN | 105689643 A | 6/2016 |
| CN | 108213410 A | 6/2018 |
| CN | 108247043 A | 7/2018 |
| EP | 0431924 B1 | 1/1996 |
| WO | 98/56566 A1 | 12/1998 |
| WO | WO-2015108546 A2 | 7/2015 |
| WO | 2017/188966 A1 | 11/2017 |

\* cited by examiner

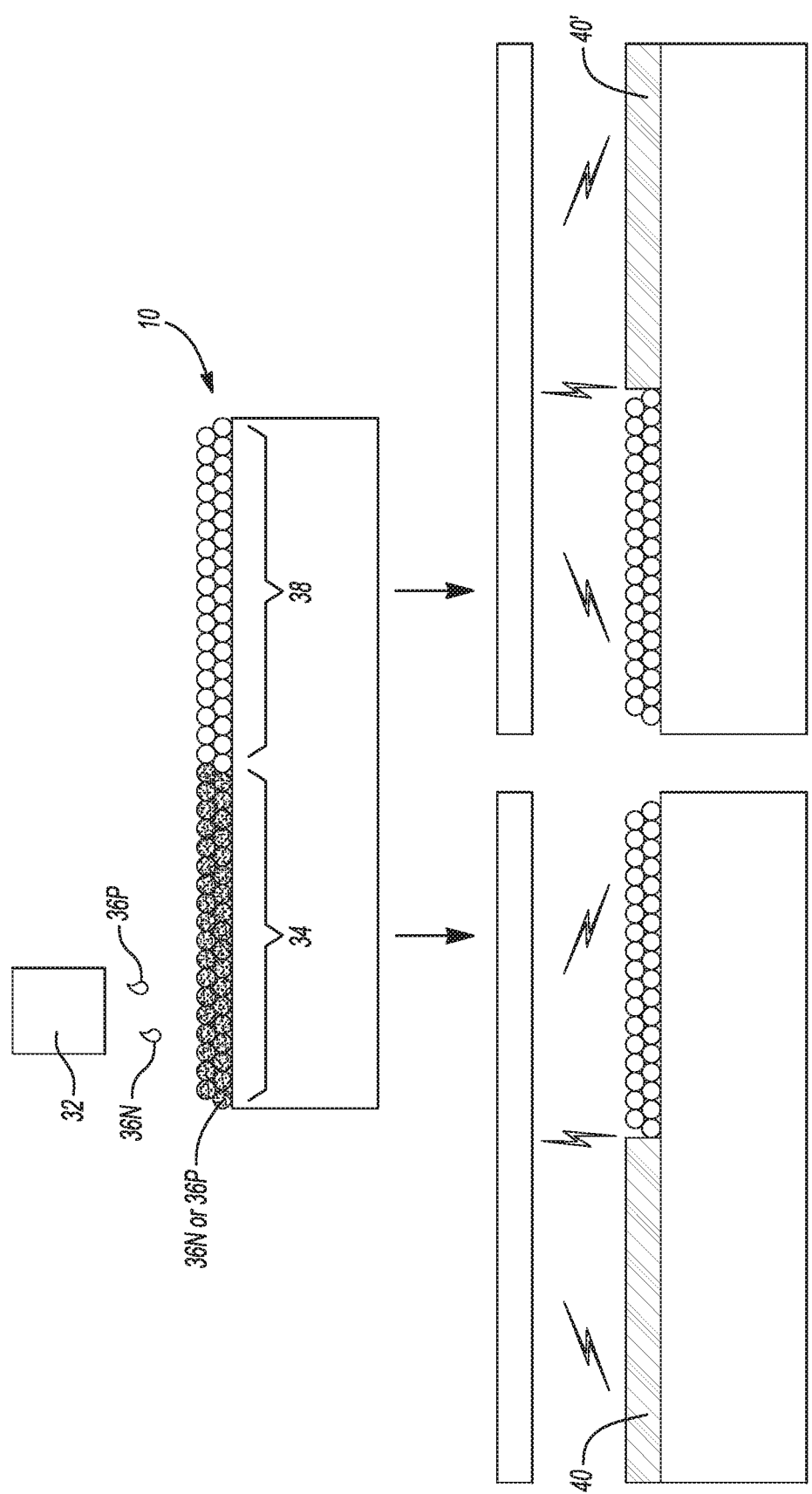

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 7 is a schematic illustration of a 3D printing method using a masking agent;

DETAILED DESCRIPTION

Figure 1:
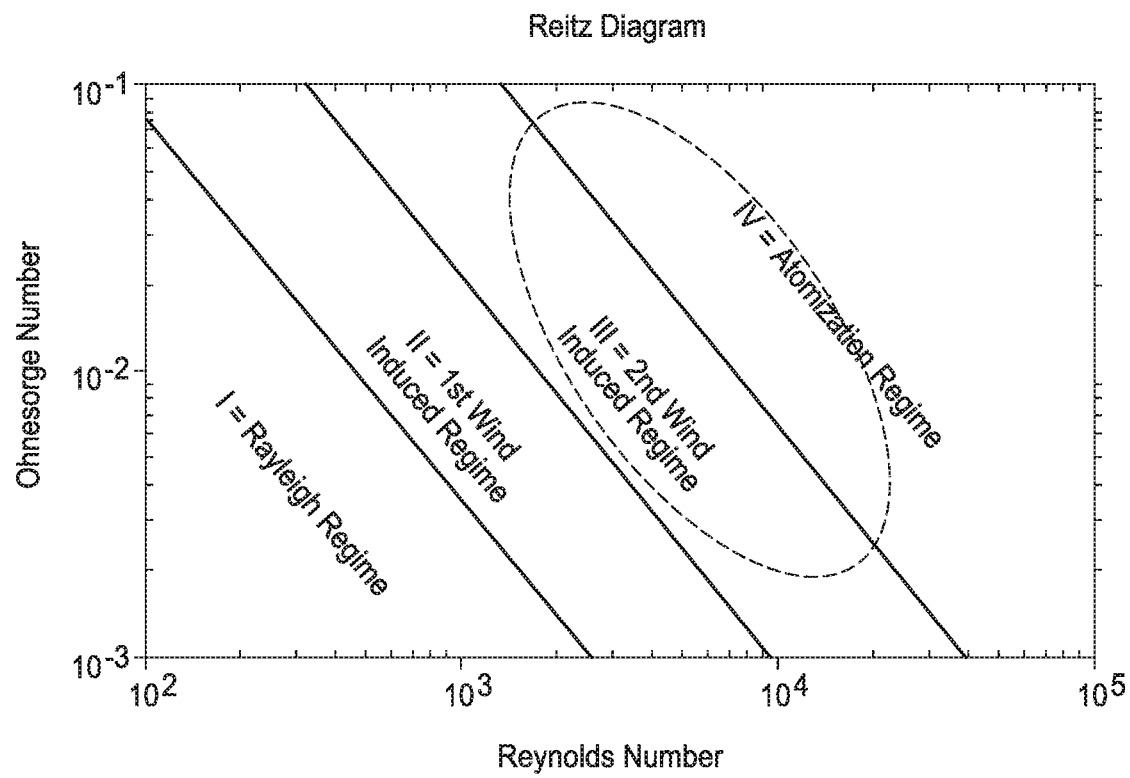
FIG. 1 is a graph of the Reitz diagram illustrating Reynolds number (X-axis) and Ohnesorge number (Y-axis) combinations that result in different jetted liquid behaviors, where the encircled area depicts desirable numbers for the dispersions disclosed herein.

In some methods for three-dimensional (3D) printing, build material particles may range in particle size and/or shape, and may be applied using a spreading technique. Build material including small particles and/or irregularly shaped particles may be less expensive to produce than build material including larger, spherical particles having a Gaussian particle size distribution. However, build material that includes medium particles (e.g., having a particle size from 20 µm to about 30 µm) and/or small particles (e.g., having a particle size less than 20 µm) tends to form irregularly-shaped clumps during spreading, due to interaction (i.e., attraction) between the particles, thereby restricting the ability of the powder to be spread into a uniform layer. Furthermore, when the dry build material includes "fines" (i.e., very small particles having a particle size less than 5 µm) along with the medium and/or small particles, the fines may stick to the larger particles in the dry build material, which further restricts the ability of the powder to be spread into a uniform layer. Additionally, dry build material that includes irregularly shaped particles is very difficult to spread into a uniform layer. Non-uniform layers can lead to 3D parts having imprecise shapes, varying structural properties, structural defects and/or varying visual qualities.

In examples of the method for 3D printing disclosed herein, one or more dispersions is/are sprayed to form a layer including build material particles and a liquid agent, and the liquid agent is evaporated from the layer. This forms a build material layer. Forming the build material layer in this manner enables a thin layer (e.g., less than 50 µm thick down to about 5 µm thick) of build material particles to be formed that also has a substantially uniform thickness. As used herein, "substantially uniform thickness" may refer to a layer that has a height (i.e., in the Z direction) with less than 30% variation along its entire length (i.e., in the X direction) and along its entire width (i.e., in the Y direction). In some instances, the variation in height along the entire length and width is less than 25%, or less than 20%. These thin and substantially uniform layers can be obtained even when small particles and/or irregularly shaped particles are used.

The spraying method of forming build material layers may be suitable for use in a variety of three-dimensional printing methods.

Some examples of 3D printing disclosed herein may utilize a binder agent to pattern layers of the build material to form a green part (referred to herein as "3D intermediate part"), which is subsequently sintered to form a 3D object. The binder agent may include a polymer binder, such as polymer latex particles, that when cured, temporarily hold together the build material particles of the 3D intermediate part. The 3D intermediate part may be moved from the build area platform 26 to a separate device for heating to remove the binder particles and to sinter the build material particles of the 3D intermediate part to form the 3D object.

Other examples of 3D printing disclosed herein may utilize a masking agent (e.g., a positive masking agent or a negative masking agent) to pattern the layer of build material. In these examples, an entire build material layer is exposed to high energy radiation causing heating of the particles. When a positive masking agent is used, the patterned region (which, in some instances, is less than the entire layer) of the build material layer is sintered or fused to become a layer of a 3D object. When a negative masking agent is used, the non-patterned region of the build material layer is sintered or fused to become a layer of a 3D object.

Still other examples of 3D printing disclosed herein may utilize selective laser sintering (SLS) or selective laser melting (SLM). During selective laser sintering or melting, a laser beam is aimed at a selected region (which, in some instances, is less than the entire layer) of a layer of build material. Heat from the laser beam causes the build material under the laser beam to sinter or fuse.

Throughout this disclosure, a weight percentage that is referred to as "wt % active" and a volume percentage that is referred to as "vol % active" refers to the loading (respectively based on weight or volume) of an active component of a dispersion or other formulation that is present in the dispersion(s), the binder agent, and/or the masking agent. For example, polymer binder particles may be present in a water-based formulation (e.g., a stock solution or dispersion) before being incorporated into the binder agent. In this example, the wt % actives of the polymer binder particles accounts for the loading (as a weight percent) of the polymer binder particle solids that are present in the binder agent, and does not account for the weight of the other components (e.g., water, etc.) that are present in the stock solution or dispersion with the polymer binder particles. Similarly, the vol % actives of the polymer binder particles accounts for the loading (as volume percent) of the polymer binder particle solids that are present in the binder agent, and does not account for the volume of the other components (e.g. water, etc.) that are present in the stock solution or dispersion with the polymer binder particles. The term "wt % (or vol. %)," without the term actives, refers to either i) the loading (in the dispersion(s), the binder agent, and/or the masking agent) of a 100% active component that does not include other non-active components therein, or ii) the loading (in the dispersion(s), the binder agent, and/or the masking agent) of a material or component that is used "as is" and thus the wt % (or vol. %) accounts for both active and non-active components.

Dispersions

Examples of the dispersion(s) disclosed herein include build material particles and a liquid agent. In some examples, the dispersion(s) consist(s) of the build material particles and the liquid agent with no other components. In other examples, the dispersion(s) may include other components, such as a dispersant and/or an additive. In yet other examples, the dispersion(s) consist(s) of the build material particles, the liquid agent, and the dispersant with no other components. In still other examples, the dispersion(s) consist(s) of the build material particles, the liquid agent, the dispersant, and the additive, with no other components.

In examples of the methods disclosed herein, one or more dispersions may be used. When one dispersion is sprayed to form a layer, the components of the sprayed layer (e.g., the build material particles, the liquid agent, etc.), prior to evaporation, are the components of the dispersion. When multiple dispersions are sprayed to form a layer, the components of the sprayed layer, prior to evaporation, include the components of each of the multiple dispersions. In these examples, the components of a single layer may be included in separate dispersions prior to the formation of the layer. In these examples, each dispersion may include at least some of the liquid agent and at least some of the build material particles that end up in the sprayed layer. In one particular example, one of the one or more dispersions includes at least some of the liquid agent (that is present in the sprayed layer), at least some of the build material particles (that are present in the sprayed layer), and a dispersant (that is present in the sprayed layer).

As used herein, "dispersion" or "dispersion(s)" may refer to: (i) one of the one or more dispersions, (ii) at least one of the one or more dispersions, or (iii) each of the one or more dispersions.

The dispersion(s) disclosed herein are sprayable. As used herein, "sprayable" refers to the ability of the dispersion(s) to be ejected from a nozzle in a jet or stream and to break into droplets (which contain build material particles) immediately after ejection. The physical properties of the dispersion (e.g., density, surface tension, and viscosity) enable the jet or stream to break into droplets.

The density is highly dependent upon the build material that is used and the surface tension is equal to the surface tension of the liquid in which the build material particles are dispersed. As such, these parameters may vary depending upon the dispersion components.

In an example, the dynamic viscosity may be determined using Einstein's formula:

$$\mu = \mu_l(1 + 2.5\varphi)$$

where $\mu_l$ is the dynamic viscosity of liquid phase of the dispersion and $\varphi$ is the volume concentration of solid particles in the dispersion. The dynamic viscosity varies exponentially with temperature (e.g., the temperature of the printing environment), according to the Reynold's model:

$$\mu(T) = \mu_0 \exp(-bT)$$

where T is the temperature and $\mu_0$ and $b$ are constants. As an example, at least one of the one or more dispersions has a viscosity ranging from about 0.1 mPa·sec (0.0001 Pa·sec) to about 50 mPa·sec (0.5 Pa sec) at 20° C. Table 1 illustrates some example dynamic viscosities for dispersions with different loadings of stainless steel particles (SSP) in different liquid agents (water or isopropyl alcohol) at different temperatures.

TABLE 1

| Dispersion | Temperature (° C.) | Dynamic Viscosity (Pa*s) |
|---|---|---|
| H$_2$O; 50 vol % SSP | 20 | 2.48*10$^{-3}$ |
|  | 80 | 7.1*10$^{-4}$ |
| H$_2$O; 20 vol % SSP | 20 | 1.65*10$^{-3}$ |
|  | 80 | 4.4*10$^{-4}$ |
| IPA; 50 vol % SSP | 20 | 4.95*10$^{-3}$ |
|  | 80 | 2.07*10$^{-3}$ |
| IPA; 20 vol % SSP | 20 | 3.3*10$^{-3}$ |
|  | 80 | 1.23*10$^{-3}$ |

To obtain a substantially uniform layer of the dispersion disclosed herein, it is desirable for the jetted stream to be within the encircled area of FIG. 1 (within a second wind-induced regime or an atomization regime on the Reitz diagram) so that desirably small droplets are formed. In the first (Rayleigh) regime, the jet velocity is relatively low, resulting in laminar flow through the nozzle. This jetted dispersion is broken into large droplets away from the nozzle. In the second (1$^{st}$ wind-induced) regime, the jet velocity is increased and turbulence is initiated, which causes oscillations on the jet or stream. This jetting dispersion is more broken up, resulting in smaller droplets than those observed in the first regime. The effect observed in the second regime is enhanced in the third (2$^{nd}$ wind-induced) regime, leading to even smaller droplets which are desirable in the examples disclosed herein. In the fourth (atomization regime), the jet disintegrates within the nozzle and the droplets are even smaller. In the examples disclosed herein, any dispersion having values in the fourth regime or near the border of the third and fourth regimes (as shown in the encircled area in FIG. 1) may be used.

The Reitz diagram in FIG. 1 may be used to identify suitable Ohnesorge and Reynolds numbers for the dispersions so that they are capable of jetting within one of the two regimes, and the following calculations may be used to identify suitable physical properties (e.g., density, dynamic viscosity, surface tension) based on the Ohnesorge and Reynolds numbers.

i) Reynolds number $R_e$ (elucidating mixture destabilizing forces):

$$R_e = \frac{vL\rho}{\mu}$$

where v is the ejected jet velocity (see ii below), L is the diameter of the nozzle used, ρ is the density of the dispersion, and μ is the dynamic viscosity;

ii) Bernoulli's formula (for ejected jet velocity):

$$v = \sqrt{\frac{2\Delta p}{\rho}}$$

Δp is the pressure differential between the dispersion inside the spray vessel and the surrounding environment into which the pressure is sprayed (surrounding environment=atmospheric pressure) and ρ is the density of the dispersion;

iii) Ohnesorge number $O_h$:

$$O_h = \frac{\sqrt{W_e}}{R_e},$$

where $R_e$ is Reynolds number and $W_e$ is the Weber number (see iv below);

iv) Weber number (elucidating mixture stabilizing forces):

$$W_e = \frac{v^2 L\rho}{\sigma}$$

where v is the ejected jet velocity, L is the diameter of the nozzle used, ρ is the density of the dispersion, and σ is the surface tension of sprayed mixture.

Each of the components of the dispersion(s) will now be described in more detail.

Build Material Particles

The build material particles may include polymer particles, ceramic particles, and/or metal particles. The composition of the build material particles may depend, at least in part, on the 3D printing process used and/or the 3D object to be formed.

In some examples of the methods disclosed herein, the build material particles are selected from the group consisting of polymer particles, ceramic particles, metal particles, and combinations thereof. In other examples, the build material particles are selected from the group consisting of ceramic particles, metal particles, and combinations thereof.

In some examples, the build material particles consist of a single type of particles. In one of these examples, the build material particles consist of polymer particles with no other particles. In another of these examples, the build material particles consist of ceramic particles with no other particles. In still another of these examples, the build material particles consist of metal particles with no other particles.

In other examples, the build material particles may include a mixture of particles. In some examples of the methods disclosed herein, the build material particles include a mixture of two or more metals or a mixture of a metal and a ceramic. In other examples, the build material particles may include a mixture of two or more polymers, a mixture of two or more ceramics, or a mixture of a polymer and a ceramic. In still other examples, the build material particles may include a mixture of a polymer and a metal.

In some examples, the build material particles include polymer particles. In these examples, the polymer particles may include any polymeric material suitable for 3D printing.

In some of these examples, the polymer particles may include a crystalline or semi-crystalline polymer. Some examples of semi-crystalline polymers include polyamides (PAs), such as polyamide 11 (PA 11/nylon 11), polyamide 12 (PA 12/nylon 12), polyamide 6 (PA 6/nylon 6), polyamide 4,6 (PA 4,6/nylon 4,6), polyamide 13 (PA 13/nylon 13), polyamide 6,13 (PA 6,13/nylon 6,13), polyamide 8 (PA 8/nylon 8), polyamide 9 (PA 9/nylon 9), polyamide 66 (PA 66/nylon 66), polyamide 612 (PA 612/nylon 612), polyamide 812 (PA 812/nylon 812), polyamide (PA 912/nylon 912), etc. Other examples of crystalline or semi-crystalline polymers suitable for use as the polymer particles include polyethylene, polypropylene, and polyoxomethylene (i.e., polyacetals). Still other examples of suitable polymer particles include polystyrene, polycarbonate, polyester, polyurethanes, other engineering plastics, and blends of any two or more of the polymers listed herein. One example of a suitable polyester is polybutylene terephthalate (PBT).

In some examples, the polymer particles may include a thermoplastic elastomer. Some examples of thermoplastic elastomers include a thermoplastic polyamide (TPA), a thermoplastic polyurethane (TPU), a styrenic block copolymer (TPS), a thermoplastic polyolefin elastomer (TPO), a thermoplastic vulcanizate (TPV), and a thermoplastic copolyester (TPC). In an example, the thermoplastic elastomer is a thermoplastic polyamide. Thermoplastic polyamide elastomers are thermoplastic elastomer block copolymers based on nylon and polyethers or polyesters. Examples of TPA elastomers include polyether block amide elastomers. Polyether block amide elastomers may be obtained by the polycondensation of a carboxylic acid terminated polyamide (PA 6, PA 11, PA 12) with an alcohol terminated polyether (e.g., polytetramethylene glycol (PTMG), polyethylene glycol (PEG), etc.). Two examples of commercially available PEBA elastomers include those known under the tradename of PEBAX® (Arkema) and VESTAMID® E (Evonik Industries). In another example, the thermoplastic elastomer is a thermoplastic polyurethane. Thermoplastic polyurethane elastomers may be obtained by reaction of: (i) diisocyanates with short-chain diols (so-called chain extenders) and/or (ii) diisocyanates with long-chain diols. Two examples of commercially available TPU elastomers include those known under the tradename of DESMOPAN® (Covestro) and ELASTOLLAN® (BASF Corp.).

When the polymer particles include a crystalline or semi-crystalline polymer, the crystalline or semi-crystalline polymer may have a wide processing window of greater than 5° C., which can be defined by the temperature range between the melting point and the re-crystallization temperature. In an example, the polymer particles may have a melting point ranging from about 50° C. to about 300° C. As other examples, the polymer particles may have a melting point ranging from about 155° C. to about 225° C., from about 155° C. to about 215° C., about 160° C. to about 200° C., from about 170° C. to about 190° C., or from about 182° C. to about 189° C. As still another example, the polymer particles may be polyamide particles having a melting point of about 180° C.

When the polymer particles include a thermoplastic elastomer, the thermoplastic elastomer may have a melting range within the range of from about 130° C. to about 250° C. In some examples (e.g., when the thermoplastic elastomer is a polyether block amide), the thermoplastic elastomer may have a melting range of from about 130° C. to about 175° C. In some other examples (e.g., when the thermoplastic elastomer is a thermoplastic polyurethane), the thermoplastic elastomer may have a melting range of from about 130° C. to about 180° C. or a melting range of from about 175° C. to about 210° C.

The polymer particles disclosed herein may absorb some of the radiation that is used in 3D printing. In some instances, the absorptivity of the polymer particles at a particular wavelength is 75% or more (e.g., 80%, 90%, 95%, etc.) As examples, the polymer particles substantially absorb radiation having a wavelength within the range of 400 nm to 1400 nm. In some examples, the absorption may be enhanced, e.g., by using a positive masking agent, so that build material patterned with the positive masking agent fuses, but non-patterned build material does not fuse. In other examples, the absorption may be blocked, e.g., by using a negative masking agent, so that so that non-patterned build material fuses, but build material patterned with the negative masking agent does not fuse.

In some examples, the build material particles include ceramic particles. In these examples, the ceramic particles may include any ceramic material suitable for 3D printing.

In some of these examples, the ceramic particles may be selected from the group consisting of metal oxides, inorganic glasses, carbides, nitrides, borides, and combinations thereof. Some specific examples of suitable ceramic particles include alumina ($Al_2O_3$), glass, $Na_2O/CaO/SiO_2$ glass (soda-lime glass), borosilicate glass, alumina silica glass, silicon mononitride (SiN), silicon dioxide ($SiO_2$), zirconia ($ZrO_2$), titanium dioxide ($TiO_2$), $MgAl_2O_4$, tin oxide, yttrium oxide, hafnium oxide, tantalum oxide, scandium oxide, niobium oxide, vanadium oxide, and combinations thereof. As an example of one suitable combination, 30 wt % glass may be mixed with 70 wt % alumina.

The ceramic particles may have a melting point ranging from about 1000° C. to about 4000° C. As an example, the ceramic particles may be metal oxide particles having a melting point ranging from about 1000° C. to about 2800° C.

In some examples, the build material particles include metal particles. In these examples, the metal particles may include any metal material suitable for 3D printing.

In one of these examples, the metal particles may be a single phase metallic material composed of one element. In this example, sintering may occur below the melting point of the single element. In another example, the metal particles are composed of two or more elements, which may be in the form of a single phase metallic alloy or a multiple phase metallic alloy. In these other examples, sintering may occur over a range of temperatures. With respect to alloys, materials with a metal alloyed to a non-metal (such as a metal-metalloid alloy) can be used as well.

In some examples, the metal particles may be selected from the group consisting of aluminum, aluminum alloys, titanium, titanium alloys, copper, copper alloys, cobalt, cobalt alloys, chromium, chromium alloys, nickel, nickel alloys, vanadium, vanadium alloys, tin, tin alloys, tungsten, tungsten alloys, tungsten carbide, tantalum, tantalum alloys, molybdenum, molybdenum alloys, magnesium, magnesium alloys, gold, gold alloys, silver, silver alloys, zirconium, zirconium alloys, ferrous alloys, stainless steel, steel, and an admixture thereof. Specific alloy examples can include AlSi 10Mg, 2xxx series aluminum, 4xxx series aluminum, CoCr MP1, CoCr SP2, Maraging steel MS1, HASTELLOY™ C, HASTELLOY™ X, NickelAlloy HX, INCONEL™ IN625, INCONEL™ IN718, stainless steel GP1, stainless steel 17-4PH, stainless steel 316L, stainless steel 430L titanium 6Al4V, and titanium 6Al-4V ELI7. While several example alloys have been provided, it is to be understood that other alloys may be used.

The temperature(s) at which the metal particles sinter together may range from about 500° C. to about 3,500° C. In some examples, the metal particles may have a melting point ranging from about 500° C. to about 3,500° C. In other examples, the metal particles may be an alloy having a range of melting points.

Other examples of suitable build materials may include carbon nanotubes or graphene platelets.

The build material particles may be similarly sized or differently sized. In some examples of the methods disclosed herein, the build material particles have an average particle size ranging from about 0.1 μm to about 100 μm. The term "average particle size", as used herein, may refer to a number-weighted mean diameter or a volume-weighted mean diameter of a particle distribution. In some examples, the build material particles may have a D50 particle size distribution value that may range from about 1 μm to about 100 μm, from about 1 μm to about 50 μm, etc. Individual particle sizes may be outside of these ranges, as the "D50 particle size" is defined as the particle size at which about half of the particles are larger than the D50 particle size and about half of the other particles are smaller than the D50 particle size (by weight based of the build material particles).

The shape of the build material particles may be spherical, non-spherical, irregularly shaped (e.g., platelet-shaped), random shapes, or a combination thereof. In some examples of the methods disclosed herein, the build material particles may be irregularly shaped. In an example, irregularly shaped build material particles may have an aspect ratio ranging from about 2 to about 100. As one example, when the build material particles include polymer particles, the polymer particles may be formed of, or may include, short fibers (having a length that is greater than their width) that may, for example, have been cut into short lengths from long strands or threads of material. As another example, when the build material particles include metal particles, the metal particles may be formed by grinding, which may produce irregularly shaped metal particles. As still another example, when the build material particles include metal particles, the metal particles may be formed by atomization.

In some examples of the methods disclosed herein, the build material particles are present in the dispersion in an amount ranging from about 5 vol % to about 60 vol %, based on a total volume of the dispersion. In an example of the methods disclosed herein, the build material particles may be present in the dispersion in an amount ranging from about 30 vol % to about 60 vol %, based on a total volume of the dispersion. In another example of the methods disclosed herein, one of the one or more dispersions includes at least some of the liquid agent and at least some of the build material particles, and the at least some of the build material particles are present in an amount ranging from about 5 vol % to about 60 vol %, based on a total volume of the one of the one or more dispersions.

Liquid Agents

The dispersion(s) disclosed herein also include the liquid agent. The liquid agent may be selected to be compatible with the build material particles that are to be used in the dispersion. As used herein, "compatible with the build material particles" means that the build material particles used do not react with or dissolve in the liquid agent. The liquid agent may also be selected so that the build material particles are able to be dispersed therein, and so that the dispersion(s) is/are sprayable. Further, the liquid agent may evaporate at an ambient printing temperature or at a heating temperature. As used therein, the phrase "ambient printing temperature" may refer to the temperature of the environment in which the 3D printing process is performed (e.g., a temperature ranging from about 40° C. to about 50° C.). The heating temperature may be any temperature above the ambient printing temperature that does not fuse or sinter the build material. In an example, the heating temperature may be the temperature at which the spread build material particles are held and/or to which the spread build material particles are heated after spraying.

The liquid agent used in the dispersion(s) may depend, at least in part, on the build material particles used, whether other components, such as a dispersant, are included in the dispersion(s), and/or the ambient printing temperature. In some examples of the methods disclosed herein, the liquid agent is selected from the group consisting of water, n-propanol, isopropanol, methanol, pentane, n-hexane, ethanol, acetic acid, n-butanol, ethyl acetate, butyl alcohol, ether, and miscible combinations thereof. As mentioned herein, the liquid agent is selected so that it does not dissolve the build material particles, and thus is dependent upon the build materials being used.

In some examples of the methods disclosed herein, the liquid agent is present in the dispersion in an amount ranging from about 40 vol % to about 95 vol %, based on a total volume of the dispersion. In an example of the methods disclosed herein, the liquid agent may be present in the dispersion in an amount ranging from about 40 vol % to about 70 vol %, based on a total volume of the dispersion. In another example of the methods disclosed herein, one of the one or more dispersions includes at least some of the liquid agent and at least some of the build material particles (that are present in the sprayed layer), and the at least some of the liquid agent is present in an amount ranging from about 40 vol % to about 95 vol %, based on a total volume of the one of the one or more dispersions.

Dispersants

The dispersion(s) disclosed herein may include a dispersant to help disperse the build material particles in the liquid agent. The dispersant may also be removable during the 3D printing process or compatible with the 3D object formed. As used herein, "compatible with the 3D object formed" means that the dispersant does not deleteriously effect mechanical and/or aesthetic properties of the 3D object formed.

The dispersant used in the dispersion(s) may depend, at least in part, on the build material particles used, the liquid agent used, and/or the 3D printing process used. Examples of the dispersant include anionic dispersants, nonionic dispersants, and cationic dispersants.

Suitable anionic dispersants include carboxylates, sulfonates, petroleum sulfonates, alkylbenzenesulfonates, naphthalenesulfonates, olefin sulfonates, alkyl sulfates, sulfates, sulfated natural oils and fats, sulfated esters, sulfated alcanolamides, and alkylphenols. One specific example of a suitable anionic dispersant is dioctyl sodium sulfosuccinate (also known as Aerosol OT).

Suitable nonionic dispersants include ethoxylated aliphatic alcohols, polyoxyethylene surfactants, carboxylic esters, polyethylene glycol esters, anhydrosorbitol esters and their ethoxylated derivatives, glycol esters and fatty acids, carboxylic amides, monoalkanolamine condensates, and polyoxyethylene fatty acid amides. Specific examples of suitable nonionic dispersants include branched octylphenoxy poly(ethyleneoxy)ethanol (commercially available as IGEPAL® CA-630 from Rhodia Operations), polyoxyethylene octyl phenyl ether (also known as TRITON™ X-100 from The Dow Chemical Co.), polysorbate 20 (also known as TWEEN™ 20), polysorbate 80 (also known as TWEEN™ 80), sorbitan laurate (commercially available as SPAN® 20 from Uniqema Americas), sorbitan oleate (commercially available as SPAN® 80 from Uniqema Americas). In some examples, submicron polymer particles may be used as the nonionic dispersant.

Suitable cationic dispersants include quaternary ammonium salts, amines with amide linkage, polyoxyethylene alkyl and alicyclic amines, N,N,N'N' trakis substituted ethylenediamines, and 2-alkyl 1-hydroxethyl 2-imidazolines.

Amphoteric dispersants may also be used. Suitable amphoteric dispersants include amphoteric surfactants containing both an acidic and a basic hydrophilic moiety in their surface. One specific example of a suitable amphoteric dispersant is N-coco 3-aminopropionic acid and sodium salt.

In some examples, a single dispersant is used in the dispersion(s). In other examples, a combination of dispersants is used in the dispersion(s).

Whether a single dispersant is used or a combination of dispersants is used, the total amount of dispersant(s) in the dispersion(s) may range from about 0.001 vol % active to about 0.1 vol % active based on the total volume of the dispersion(s).

Additives

The dispersion(s) disclosed herein may also include an additive. In some examples, the additive is selected from the group consisting of an antioxidant, a humectant, a surfactant, an antimicrobial agent, a viscosity modifier, a pH adjuster, a chelating agent, an adhesion promoter, an antifoaming agent, a deodorant, and a combination thereof.

Antioxidant(s) may be added to the dispersion(s) when the build material particles include polymer particles. The antioxidant(s) may prevent or slow molecular weight decreases of the polymer particles and/or may prevent or slow discoloration (e.g., yellowing) of the polymer particles by preventing or slowing oxidation of the polymer particles. In some examples, the antioxidant may discolor upon reacting with oxygen, and this discoloration may contribute to the discoloration of the build material. The antioxidant may be selected to minimize this discoloration. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are mixed into the dispersion(s). In an example, the antioxidant may be included in the dispersion(s) in an amount ranging from about 0.01 wt % to about 5 wt %, based on the weight of the polymer particles. In other examples, the antioxidant may be included in the dispersion(s) in an amount ranging from about 0.01 wt % to about 2 wt % or from about 0.2 wt % to about 1 wt %, based on the weight of the polymer particles.

The dispersion(s) may also include a humectant, a surfactant, an antimicrobial agent, a viscosity modifier, a pH adjuster, and/or a chelating agent, each of which is described below in reference to the liquid vehicle of the binder agent. As such, the dispersion(s) may include any of the components described below in reference to the liquid vehicle of the binder agent in any of the amount described below (with the amount(s) being based on the total weight of the dispersion(s) rather than the total weight of the binder agent).

Other suitable additives include an adhesion promoter to help the sprayed dispersion stick to an underlying layer of build material particles, an anti-foaming agent to reduce or prevent foaming of the printed dispersion, and/or a deodorant to impart a desired odor to the 3D part being formed. Any suitable adhesion promoter, anti-foaming agent and/or deodorant may be used, alone or in combination with any one or more of the other additives.

Printing Methods and Methods of Use

Figure 2:
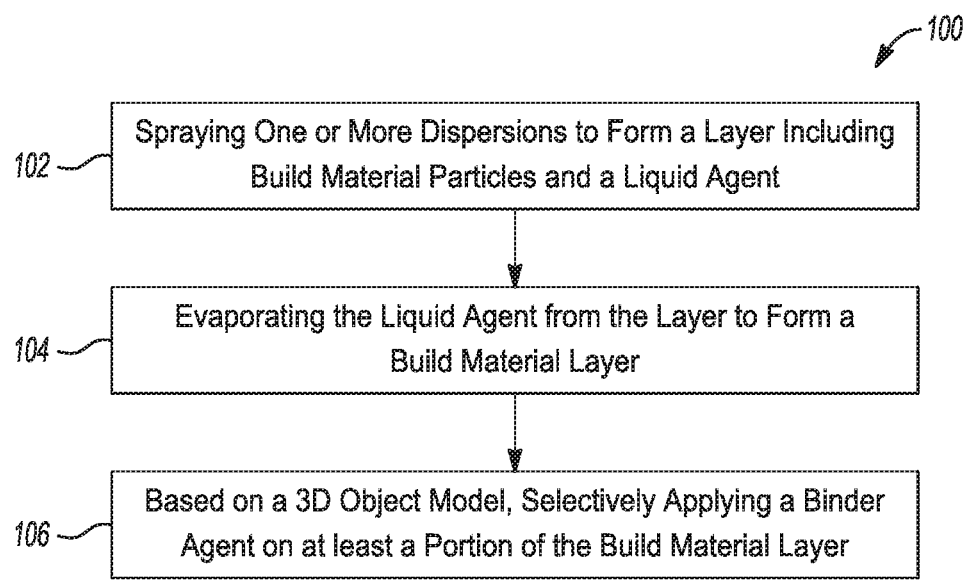
FIG. 2 is a flow diagram illustrating an example of a method for 3D printing.
Figure 3:
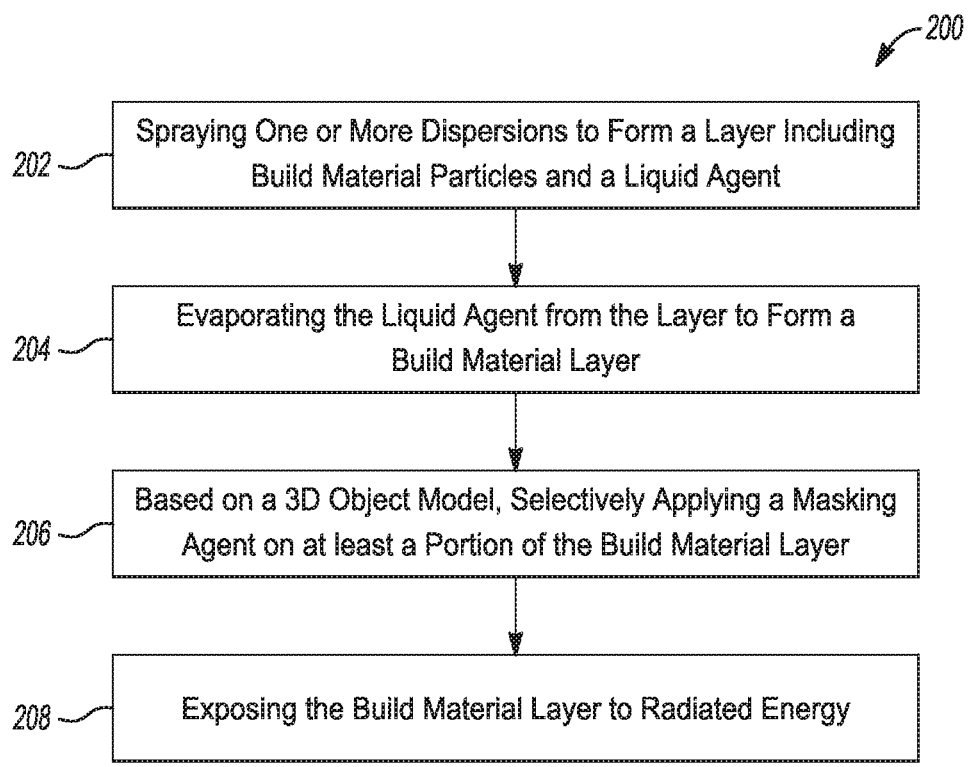
FIG. 3 is a flow diagram illustrating an example of a method for 3D printing.
Figure 4:
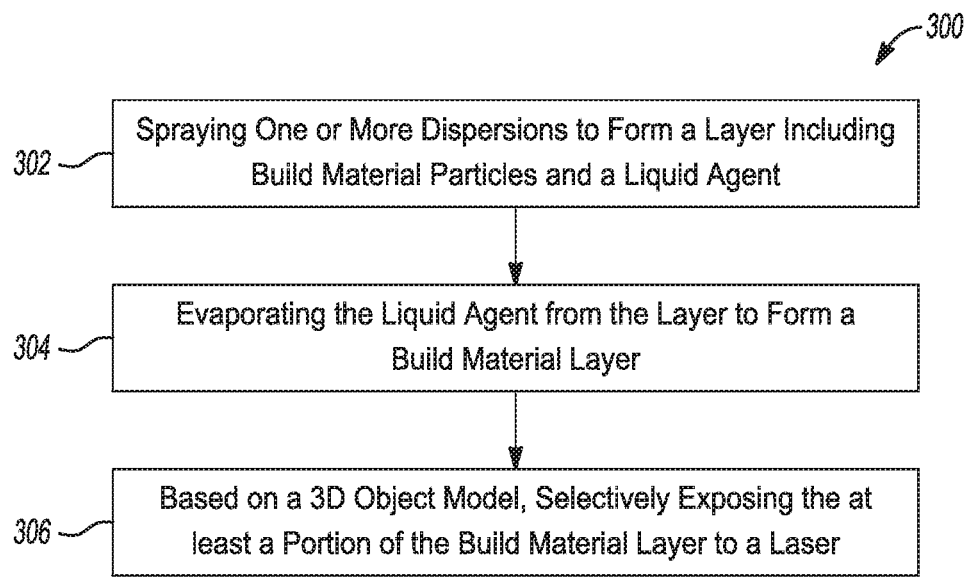
FIG. 4 is a flow diagram illustrating an example of a method for 3D printing.

Referring now to FIGS. 2 through 4, examples of methods 100, 200, 300 are depicted. The examples of the methods 100, 200, 300 may use examples of the dispersion disclosed herein to form 3D objects.

As shown in FIG. 2, the method 100 for three-dimensional (3D) printing comprises: spraying one or more dispersions to form a layer including build material particles and a liquid agent (reference numeral 102); evaporating the liquid agent from the layer to form a build material layer (reference numeral 104); and based on a 3D object model, selectively applying a binder agent on at least a portion of the build material layer (reference numeral 106). Examples of the method 100 will be further described below in the section labeled "Printing with Binder Agents" and in reference to FIG. 6.

As shown in FIG. 3, the method 200 for three-dimensional (3D) printing comprises: spraying one or more dispersions to form a layer including build material particles and a liquid agent (reference numeral 202); evaporating the liquid agent from the layer to form a build material layer (reference numeral 204); based on a 3D object model, selectively applying a masking agent on at least a portion of the build material layer (reference numeral 206); and exposing the build material layer to radiated energy (reference numeral 208). Examples of the method 200 will be further described below in the section labeled "Printing with Masking Agents" and in FIG. 7.

As shown in FIG. 4, the method 300 for three-dimensional (3D) printing comprises: spraying one or more dispersions to form a layer including build material particles and a liquid agent (reference numeral 302); evaporating the liquid agent from the layer to form a build material layer (reference numeral 304); and based on a 3D object model, selectively exposing the at least a portion of the build material layer to a laser (reference numeral 306). Examples of the method 300 will be further described below in the section labeled "Printing using SLS/SLM" and in FIG. 8.

While not shown, any example of the methods 100, 200, 300 may include forming the dispersion(s). In an example, the dispersion(s) is/are formed prior to spraying the dispersion(s) to form the layer. Each dispersion may be formed by mixing its components (i.e., at least some of the liquid agent, at least some of the build material particles, etc.) together. The dispersion may be formed in advance of spraying (e.g., suspension mixed and loaded into a spaying assembly) or the individual components may be loaded into a sprayer and mixed just before spraying.

Furthermore, prior to execution of any examples of the methods 100, 200, 300, it is to be understood that a controller may access data stored in a data store pertaining to a 3D part/object that is to be printed. For example, the controller may determine the number of build material layers that are to be formed, the locations at which any of the agents is/are to be deposited on each of the respective layers, etc.

Forming Build Material Layers

Figure 5:
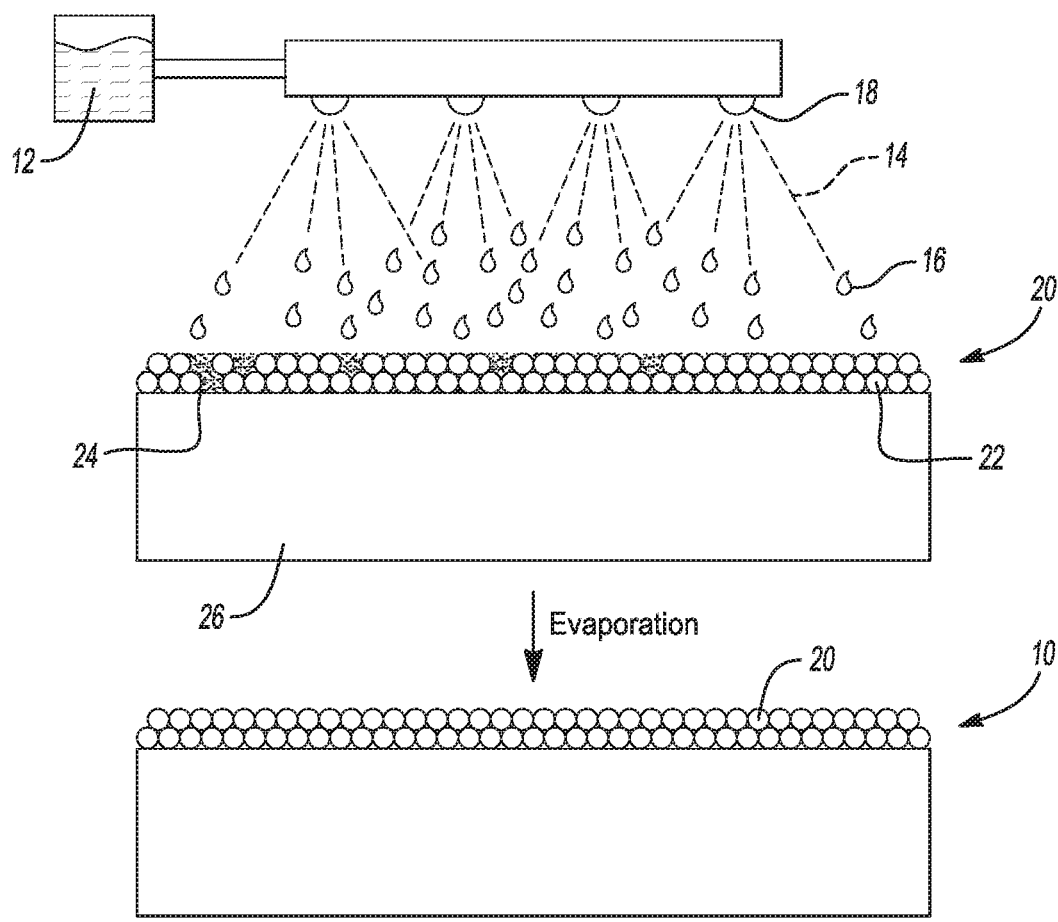
FIG. 5 is a schematic illustration of a method for forming a build material layer.

As mentioned above, in examples of the methods 100, 200, 300 disclosed herein, forming a build material layer includes spraying one or more of the dispersions. The formation of a single build material layer 10 is shown in FIG. 5. In some examples (as shown in FIG. 5), a single dispersion 12 is sprayed. In other examples, multiple dispersions are sprayed.

As used herein, "spraying" refers to the ejection of a jet or stream 14 of the dispersion 12 wherein the jet or stream 14 breaks into droplets 16 immediately after ejection. The ejection of the jet or stream 14 may be accomplished using a pressure gradient (i.e., pressure differential between the dispersion inside the spray vessel/chamber and the surrounding environment into which the dispersion is sprayed). The pressure gradient forces the dispersion 12 through a nozzle 18 to form the jet or stream 14. In some examples, the pressure gradient may range from about 1 atm to about 100 atm, or from about 1.5 atm to about 50 atm, or from about 2 atm to about 10 atm. After ejection, the jet or stream 14 breaks into droplets 16. Depending upon the jet velocity, the jet or stream 14 can be broken into smaller droplets, or can be disintegrated (atomized) to form even smaller droplets. The droplets 16 may have a diameter ranging from about 10 times to about 500 times smaller than the diameter of the nozzle 18 through which the jet or stream 14 was ejected. The spray apparatus and spray parameters (i.e., the properties of the dispersion 12, the liquid agent 24, and the build material particles 22, etc.) may be selected to provide a continuous stream of droplets 16, where most of the droplets may contain from one to several build material particles 22 per droplet. In an example, spraying involves atomizing the one or more dispersions 12 by forcing the one or more dispersions 12 through a nozzle using a pressure gradient ranging from about 1 atm to about 100 atm.

The droplets 16 impinge and accumulate on a build area platform 26 to form a layer 20 including the build material particles 22 and the liquid agent 24. The build material particles 22 and the liquid agent 24 in the layer 20 are included in the one or more dispersions 12 prior to the spraying. When the layer 20 is formed by spraying a single dispersion 12, all of the build material particles 22 and all of the liquid agent 24 in the layer 18 are included in the single dispersion 12 prior to the spraying. When the layer 20 is formed by spraying multiple dispersions, each of the dispersions includes, prior to spraying, some of the build material particles 22 and some of the liquid agent 24 that end up in the layer 20. For example, when two dispersions are used, one dispersion includes some of the build material particles 22 and some of the liquid agent 24 that end up in the layer 20, and the other dispersion includes some other of the build material particles 22 and some other of the liquid agent 24 that end up in the layer 20. The layer 20 may also include other component(s) of the dispersion(s) 12, such as the dispersant.

The spraying of the one or more dispersions 12 may be accomplished at a spraying temperature. The spraying temperature may range from about 10° C. to about 150° C. In an example, the spraying temperature is about 20° C. In another example, the spraying temperature is about 80° C.

The spraying of the one or more dispersions 12 may be accomplished in a single pass or in multiple passes. As an example of single pass spraying, the desired amount of the dispersion(s) 12 may be sprayed during the same pass of the applicator(s). As an example of multiple pass spraying, the desired amount of the dispersion(s) may be sprayed over several passes of the applicator(s).

The amount of the dispersion(s) 12 deposited on the build platform 26 may depend, at least in part on the desired thickness of the build material layer 10 to be formed and/or the build material particles 20 loading in the dispersion(s) 12. The desired thickness may be achieved by spraying a corresponding amount of the dispersion(s) 12 in a single pass or over multiple passes (as mentioned above). The speed of the spraying apparatus and the velocity of the spray may be controlled in order to deposit the desired amount and achieve the desired thickness.

As mentioned above, in examples of the methods 100, 200, 300 disclosed herein, forming a build material layer 10 also includes evaporating the liquid agent 24 from the layer 20. In some examples, evaporating the liquid agent 24 from the layer 20 includes evaporating substantially all (e.g., from about 95 vol % to about 99 vol %) of the liquid agent 24 from the layer 20. In other examples, evaporating the liquid agent 24 from the layer 20 includes evaporating all (i.e., 100 vol %) of the liquid agent 24 from the layer 20.

In some examples, the liquid agent 24 may evaporate at an ambient printing temperature. In some of these examples, the ambient printing temperature may range from about 40° C. to about 50° C. In some examples, the build area platform 26 is maintained at the ambient printing temperature, and thus additional heating is not performed in order to achieve evaporation.

In other examples, the liquid agent 24 may evaporate at a heating temperature, which is higher than the ambient printing temperature. In these examples, evaporating the liquid agent may include increasing the temperature to heat the layer 20 to the heating temperature. In some examples, multiple techniques may be used together to achieve the heating temperature. For example, the temperature of the build area platform 26 may be temporarily raised to a first temperature and then pulse heating may be used to further increase the temperature to the desired heating temperature. Using a combination of heating techniques may enable the liquid agent 24 to be rapidly evaporated.

The heating temperature selected may depend, at least in part, on the liquid agent 24 used, and the build material particles 22 used. In an example, the heating temperature may be below the melting or softening point of the build material particles 22. In some examples, the heating temperature may be at least 5° C., or at least 50° C. below the melting or softening point of the build material particles 22. In another example, the heating temperature may be below the boiling point of the liquid agent 24. In still another example, the heating temperature may be equal to or above the boiling point of the liquid agent 24. As examples, the heating temperature may range from about 50° C. to about 205° C., from about 50° C. to about 100° C., from about 50° C. to about 80° C., or from about 80° C. to about 100° C., from about 100° C. to about 190° C. The ranges provided are some examples, and higher or lower temperatures may be used.

Heating the layer 20 to the heating temperature may be accomplished using any suitable heat source that exposes all of the layer 20 to the heat. Examples of the heat source include a thermal heat source (e.g., a heater (not shown) integrated into the build area platform 26 (which may include sidewalls)) or a radiation source.

Evaporating the liquid agent 24 from the layer 20 forms the build material layer 10. In some examples, the build material layer 10 that is formed consists of the build material particles 20. In other examples, the build material layer 10 that is formed may include other components, such as the dispersant and/or a residual amount of the liquid agent 24.

In some examples, the build material layer 10 that is formed may have a substantially uniform thickness ranging from about 1 μm to about 200 μm. In other examples, the build material layer 10 that is formed may have a substantially uniform thickness ranging from about 1 μm to about 50 μm, from about 1 μm to about 40 μm, from about 10 μm to about 60 μm, or from about 10 μm to about 40 μm. It is to be understood that, in each of these examples, the substantially uniform thickness values are of the build material layer 10 after formation and prior to further processing.

In some examples, the methods 100, 200, 300 further comprise agitating the one or more dispersions 12 prior to the spraying of the one or more dispersions 12. The agitating process may be accomplished by any suitable means, such as shaking, stirring, etc. Agitation may help to uniformly disperse the build material particles 20 throughout the dispersion(s) 12 just prior to spraying, which may help the build material layer 10 that is formed to have a substantially uniform thickness.

It is to be understood that spraying one or more dispersions 12 to form a layer 20 including build material particles 22 and a liquid agent 24, and evaporating the liquid agent 24 from the layer 20 to form a build material layer 10 may be repeated to form additional build material layers. Each of the additional layers may be formed after the previous build material layer is patterned (e.g., with the binder agent or the masking agent) and/or exposed to radiated energy (e.g., with a flood energy source or a laser).

Printing with Binder Agents

Figure 6:
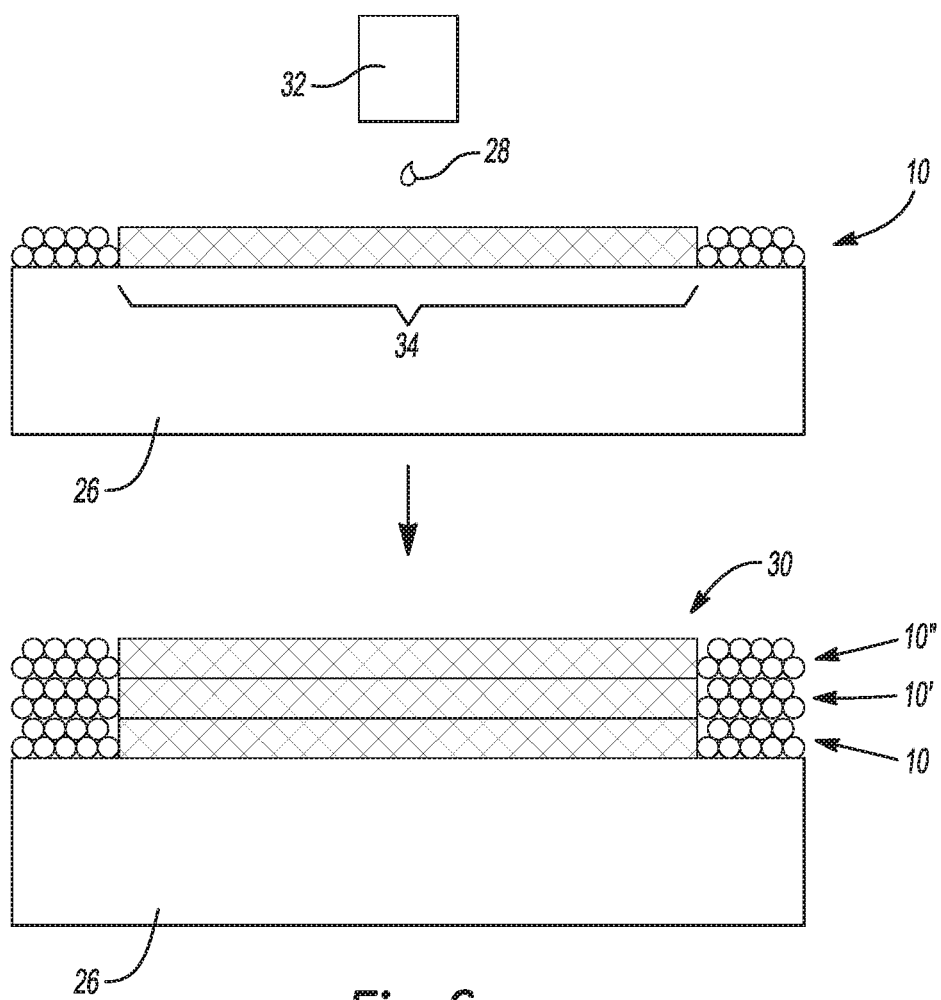
FIG. 6 is a schematic illustration of a 3D printing method using a binding agent.

Referring now to FIG. 6, in examples of the method 100 disclosed herein, after the build material layer 10 is formed, a binder agent 28 is selectively applied on at least a portion of the build material layer 10. In these examples, the formation and patterning of the build material layers 10 may be repeated to form a 3D intermediate part 30. Binder particles from the binder agent 28 may be cured to temporarily hold the build material particles 22 of the 3D intermediate part 30 together so that the 3D intermediate part 30 may be moved from the build area platform 26 to a separate device (not shown) for heating. Heating may remove the binder particles and sinter the build material particles 22 of the 3D intermediate part 30 to form the 3D object.

It is to be understood that examples of the method 100 may be used when the build material particles 22 include ceramic particles, metal particles, or a combination thereof. These particles are able to withstand the high temperature heating to remove the binder particles and to sinter the build material particles 22 to form the 3D object.

Binder Agents

As mentioned above, to bind the build material particles 22 on a layer by layer basis and form a 3D intermediate part 30, a binder agent 28 with a polymer binder can be used. In some examples of the method 100, the binder agent 28 consists of a liquid vehicle and the polymer binder. In other examples, the binder agent may include other components.

Polymer Binder

The following discussion relates particularly to the polymer particles that can be used as the polymer binder in the binder agent 28. In some examples, the polymer particles are latex particles. Latex particles refer to any polymer (homopolymer, copolymer, or heteropolymer) that is capable of being dispersed in an aqueous medium.

The polymer (latex) particles may have several different morphologies. In one example, the polymer particles can include two different copolymer compositions, which may be fully separated core-shell polymers, partially occluded mixtures, or intimately comingled as a polymer solution. In another example, the polymer particles can be individual spherical particles containing polymer compositions of hydrophilic (hard) component(s) and/or hydrophobic (soft) component(s) that can be interdispersed. In one example, the interdispersion can be according to IPN (interpenetrating networks) although it is contemplated that the hydrophilic and hydrophobic components may be interdispersed in other ways. In yet another example, the polymer particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the polymer particles can include 2, 3, or 4 or more relatively large polymer particles that can be attached to one another or can surround a smaller polymer core. In a further example, the polymer particles can have a single phase morphology that can be partially occluded, can be multiple-lobed, or can include any combination of any of the morphologies disclosed herein.

In some examples, the polymer particles can be homopolymers. In other examples, the polymer particles can be heteropolymers or copolymers. In an example, a heteropolymer can include a hydrophobic component and a hydrophilic component. In this example, the heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

Examples of monomers that may be used to form the hydrophobic component of the heteropolymer polymer (latex) particles include C4 to C8 alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific example monomers can include, C1 to C20 linear or branched alkyl (meth)acrylate, alicyclic (meth) acrylate, alkyl acrylate, styrene, methyl styrene, polyol (meth)acrylate, hydroxyethyl (meth)acrylate, or a combination thereof. In one specific class of examples, the polymer (latex) particles can be a styrene (meth)acrylate copolymer. In still another example, the polymer (latex) particles can include a copolymer with copolymerized methyl methacrylate being present at about 50 wt % or greater, or copolymerized styrene being present at about 50 wt % or greater. Both can be present, with one or the other at about 50 wt % or greater in a more specific example.

The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable liquid, such as the binder agent 28, can impact the nature of the moiety as well (acid form vs. salt or ester form). Thus, a monomer or a moiety of a polymer described as (meth)acrylic acid or as (meth)acrylate should not be read so rigidly as to not consider relative pH levels, ester chemistry, and other general organic chemistry concepts.

In still other examples, the polymer (latex) particles in the binder agent include polymerized monomers of vinyl chloride, vinylidene chloride, vinylbenzyl chloride, vinyl ester, styrene, ethylene, maleate esters, fumarate esters, itaconate esters, α-methyl styrene, p-methyl styrene, methyl methacrylate, hexyl acrylate, hexyl methacrylate, hydroxyethyl acrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, 2-phenoxyethyl methacrylate, isobornyl acrylate, tetrahydrofurfuryl acrylate, benzyl methacrylate, benzyl acrylate, ethoxylated nonyl phenol methacrylate, isobornyl methacrylate, ethylene glycol dimethacrylate, diethylene glycol dimethacrylate, triethylene glycol dimethacrylate, cyclohexyl methacrylate, trimethyl cyclohexyl methacrylate, t-butyl methacrylate, n-octyl methacrylate, lauryl acrylate, lauryl methacrylate, trydecyl methacrylate, alkoxylated tetrahydrofurfuryl acrylate, isodecyl acrylate, dimethyl maleate, dioctyl maleate, acetoacetoxyethyl methacrylate, diacetone acrylamide, N-vinyl imidazole, N-vinylcarbazole, N-Vinylcaprolactam, pentaerythritol tri-acrylate, pentaerythritol tetra-acrylate, pentaerythritol tri-methacrylate, pentaerythritol tetra-methacrylate, glycidol acrylate, glycidol methacrylate, tetrahydrofuryl acrylate, tetrahydrofuryl methacrylate, diacetone acrylamide, t-butyl acrylamide, divinylbenzene, 1,3-butadiene, acrylonitrile, methacrylonitrile, combinations thereof, derivatives thereof, or mixtures thereof. These monomers include low glass transition temperature (Tg) monomers that can be used to form the hydrophobic component of a heteropolymer.

In some examples, a composition of the polymer (latex) particles can include acidic monomer(s). In some examples, the acidic monomer content can range from 0.1 wt % to 5 wt %, from 0.5 wt % to 4 wt %, or from 1 wt % to 2.5 wt % of the polymer particles with the remainder of the polymer particles being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized to form a polymer, heteropolymer, or copolymer with a co-polymerizable dispersing agent. The co-polymerizable dispersing agent can be a polyoxyethylene compound, such as a HITENOL® compound (Montello Inc.) e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

Any suitable polymerization process can be used to form the polymer particles. In some examples, an aqueous dispersion of latex particles can be produced by emulsion polymerization or co-polymerization of any of the above monomers.

In one example, the polymer (latex) particles can be prepared by polymerizing high Tg hydrophilic monomers to form the high Tg hydrophilic component and attaching the high Tg hydrophilic component onto the surface of the low Tg hydrophobic component. In another example, the polymer (latex) particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the polymer (latex) particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the polymer (latex) particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In some examples, the polymer (latex) particles can have a weight average molecular weight (Mw, g/mol) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the polymer (latex) particles can be latent and can be activated by heat (which may be applied iteratively during 3D intermediate part formation or after 3D intermediate part formation). In these instances, the activation temperature can correspond to the minimum film formation temperature (MFFT) or a glass transition temperature ($T_g$) which can be greater than room temperature (e.g., ranging about 18° C. to about 22° C.). In one example, the polymer (latex) particles can have a MFFT or $T_g$ that can be at least about 15° C. greater than ambient temperature. In another example, the MFFT or the $T_g$ of the bulk material (e.g., the more hydrophobic portion) of the polymer (latex) particles can range from about 25° C. to about 200° C. In another example, the polymer (latex) particles can have a MFFT or $T_g$ ranging from about 40° C. to about 120° C. In yet another example, the polymer (latex) particles can have a MFFT or $T_g$ ranging from about 0° C. to about 150° C. In a further example, the polymer latex particles can have a $T_g$ that can range from about −20° C. to about 130° C., or in another example from about 60° C. to about 105° C. At a temperature above the MFFT or the $T_g$ of a latent latex polymer particle, the polymer particles can coalesce and can bind materials, such as the build material particles 22.

The polymer (latex) particles can have a particle size that can be jetted via thermal ejection or printing, piezoelectric ejection or printing, drop-on-demand ejection or printing, continuous ejection or printing, etc. In an example, the particle size of the polymer (latex) particles can range from about 1 nm to about 400 nm. In yet other examples, a particle size of the polymer particles can range from about 10 nm to about 300 nm, from about 50 nm to about 250 nm, from about 100 nm to about 250 nm, or from about 25 nm to about 250 nm. In some examples, the polymer particles can have a particle size that can be jetted via thermal ejection or printing, piezoelectric ejection or printing, drop-on-demand ejection or printing, continuous ejection or printing, etc. In these examples, the particle size of the polymer particles be about 100 nm or more.

In some examples, the polymer (latex) particles have a glass transition temperature higher than 60° C. and an average particle size of 1 nm or more.

Other examples of the polymer (latex) particles include polyvinyl alcohol, polyvinylpyrrolidone, and combinations thereof. Examples of polyvinyl alcohol include low weight average molecular weight polyvinyl alcohols (e.g., from about 13,000 to about 50,000), such as SELVOL™ PVOH 17 from Sekisui. Examples of polyvinylpyrrolidones include low weight average molecular weight polyvinylpyrrolidones (e.g., from about 15,000 to about 19,000), such as LUVITEC™ K 17 from BASF Corp.

It is to be understood that the examples of the polymer binder provided are some examples, and that other polymer binders may be used.

In an example, the polymer binder is present in the binder agent 28 in an amount ranging from about 1 wt % active to about 40 wt % active based on a total weight of the binder agent 28. In other examples, the polymer binder may be present in the binder agent 28 in an amount ranging from about 2 wt % active to about 30 wt % active, from about 5 wt % active to about 30 wt % active, from about 12 wt % active to about 22 wt % active, from about 15 wt % active to about 20 wt % active, from about 10 wt % active to about 20 wt % active, or from about 6 wt % active to about 18 wt % active, based on the total weight of binder agent 28.

Liquid Vehicles

In addition to the polymer binder, the binder agent 28 may also include a liquid vehicle. As used herein, the term "liquid vehicle" may refer to the liquid to which the polymer binder is added to form the binder agent 28.

In some examples, the liquid vehicle may make up about 60 wt % to about 99 wt % of the binder agent 28. In other examples, the liquid vehicle may be included in the binder agent 28 in an amount ranging from about 60 wt % to about 95 wt %, from about 60 wt % to about 90 wt %, from about 60 wt % to about 85 wt %, from about 60 wt % to about 80 wt %, from about 75 wt % to about 90 wt %, or from about 70 wt % to about 80 wt %, based on a total weight of the binder agent 28.

The liquid vehicle of the binder agent 28 may include water, co-solvent(s), humectant(s), surfactant(s), dispersing agent(s), antimicrobial agent(s), viscosity modifier(s), pH adjuster(s), chelating agent(s), and the like. In one example, water can be present in an amount ranging from about 30 wt % to 100 wt % of the vehicle component—excluding the polymer binder—based on a total weight of the liquid vehicle. In other examples, the water can be present in an amount ranging from about 60 wt % to about 95 wt %, from about 75 wt % to 100 wt %, or from about 80 wt % to about 99 wt %, based on a total weight of the liquid vehicle.

The co-solvent can be present at from about 0.5 wt % to about 50 wt % in the liquid vehicle, based on a total weight of the binder agent 28. In some examples, the co-solvent can be a high boiling point solvent, which can have a boiling point of at least about 110° C. Example co-solvents can include aliphatic alcohols, aromatic alcohols, alkyl diols, glycol ethers, polyglycol ethers, lactams, caprolactams, formamides, acetamides, long chain alcohols, and combinations thereof. For example, the co-solvent can include aliphatic alcohols with a —CH$_2$OH group, secondary aliphatic alcohols, 1,2-alcohols, 1,3-alcohols, 1,5-alcohols, ethylene glycol alkyl ethers, propylene glycol alkyl ethers, C6 to C12 homologs of polyethylene glycol alkyl ethers, N-alkyl caprolactams, unsubstituted caprolactams, both substituted and unsubstituted formamides, both substituted and unsubstituted acetamides, combinations thereof, and the like. Other example organic co-solvents can include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidone, 2-methyl-1,3-propanediol (MP-diol), and combinations thereof.

The liquid vehicle may also include humectant(s). In an example, the total amount of the humectant(s) present in the binder agent 28 ranges from about 3 wt % active to about 10 wt % active, based on the total weight of the binder agent 28. An example of a suitable humectant is ethoxylated glycerin having the following formula:

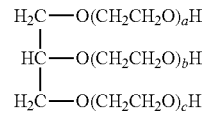

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

If a surfactant/dispersing agent is included, examples can include SURFYNOL® SEF (a self-emulsifiable wetting agent based on acetylenic diol chemistry), SURFYNOL® 104 (a non-ionic wetting agent based on acetylenic diol chemistry), or SURFYNOL® 440 (an ethoxylated low-foam wetting agent) (all available from Evonik Industries AG, Germany); TERGITOL® TMN-6 (a branched secondary alcohol ethoxylate, non-ionic surfactant), TERGITOL® 15-S-5 or TERGITOL® 15-S-7 (each of which is a secondary alcohol ethoxylate, non-ionic surfactant), or DOWFAX® 2A1 or DOWFAX® 8390 (each of which is an alkyldiphenyloxide disulfonate, available from Dow, USA); CAPSTONE® FS-35 (non-ionic fluorosurfactant from DuPont, USA) or a combination thereof. The surfactant or combinations of surfactants may be present in the binder agent 28 in an amount ranging from about 0.1 wt % active to about 5 wt % active based on the total weight of the binder agent, and in some examples, may be present at from about 0.5 wt % active to about 2 wt % active.

With respect to antimicrobial agents, any compound suitable to inhibit the growth of harmful microorganisms can be included. These additives may be biocides, fungicides, and other microbial agents. Examples of suitable antimicrobials can include NUOSEPT® (Troy, Corp.), UCARCIDE™, KORDEK™, ROCIMA™, KATHON™ (all available from The Dow Chemical Co.), VANCIDE® (R.T. Vanderbilt Co.), PROXEL® (Arch Chemicals), ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol (Thor Chemicals); AXIDE™ (Planet Chemical); NIPACIDE™ (Clariant), etc. In an example, the binder agent may include a total amount of antimicrobials that ranges from about 0.0001 wt % active to about 1 wt % active.

Chelating agents (or sequestering agents), such as EDTA (ethylene diamine tetra acetic acid), may be included to eliminate the deleterious effects of heavy metal impurities. Whether a single chelating agent is used or a combination of chelating agents is used, the total amount of chelating agent(s) in the binder agent 28 may range from greater than 0 wt % active to about 2 wt % active based on the total weight of the binder agent 28.

Viscosity modifiers and buffers may also be present, as well as other additives to modify properties of the binder agent 28. For example, buffer solutions may be used to control the pH of the binder agent 28.

In some examples, the liquid vehicle may also include from about 0.1 wt % active to about 1 wt % active of an anti-kogation agent, based on a total weight of the binder agent. Kogation refers to the deposit of dried solids on a printhead. An anti-kogation agent can be included to prevent the buildup of dried solids on the printhead. Examples of suitable anti-kogation agents can include oleth-3-phosphate (commercially available as CRODAFOS™ O3 A or CRODAFOS™ N-3 acid), dextran 500k, CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

Printing Method

In examples of the method 100, a build material layer 10 may be formed as described herein in reference to FIG. 5.

As shown in FIG. 6, after the formation of the build material layer 10, the binder agent 28 may be selectively applied on at least a portion 34 of the build material layer 10. The binder agent 28 may be ejected onto the build material layer 10 from an applicator 32 (such as a thermal inkjet printhead or a piezoelectric inkjet printhead), for example, to selectively pattern the build material layer 10. The location(s) of the selectively applied binder agent 28 can be selected to correspond with a layer of a 3D printed object, such as from a 3D object model or computer model.

Heat may be applied, such as from a heat source, to each layer 10 (or to the group of layers 10, 10', 10") to remove water from the binder agent 28 throughout the patterning process. This temperature is 100° C. or less. In one example, heat can be applied from overhead, e.g., prior to formation of the next build material layer 10, or after multiple layers are patterned, etc.), and/or can be provided by the build area platform 26 from beneath the build material layer(s) 10.

After individual build material layers 10, 10', 10" are patterned with binder agent 28, the build area platform 26 can be dropped a distance, which may correspond to at least the thickness of a patterned layer in one example, so that another build material layer 10', 10" may be formed thereon and patterned with the binder agent 28, etc. The process can be repeated on a layer by layer basis until all of the desired layers are patterned in accordance with a 3D object model.

The applicator 32 can deposit the binder agent 28 in the layers 10, 10', 10" in a pattern that corresponds to the layers of the 3D object, and can be used to form a 3D intermediate part 30 in any orientation. For example, the 3D intermediate part 30 can be printed from bottom to top, top to bottom, on its side, at an angle, or any other orientation. The orientation of the 3D intermediate part 30 can also be formed in any orientation relative to the layering of the build material particles 22. For example, the 3D intermediate part 30 can be formed in an inverted orientation or on its side relative to the layering of the build material. The orientation of build or the orientation of the 3D intermediate part 30 within the build material 22 can be selected in advance or even by the user at the time of printing, for example.

After all of the desired layers 10, 10', 10" of build material 22 are patterned with the binder agent 28, heating all of the individually patterned layers is performed. This heating is performed at a temperature ranging from about 120° C. to about 200° C. At this temperature range, heating coalesces the polymer (latex) particles to form a strong polymer film. As such, heating all of the individually patterned layers forms a polymeric network among the build material particles 22 in the patterned portions 34 of all of the individually patterned layers, thereby forming a 3D intermediate object 30. The now cured portions form the 3D intermediate object 30, and any non-patterned build material 22 surrounding the 3D intermediate object 30 remain non-cured.

Heating may occur after patterning of all of the layers 10, 10', 10", and thus the time frames can vary depending on size of the 3D intermediate part 30. For example, large objects with a smaller surface to volume ratio may take longer to drive off enough liquid to stabilize the 3D intermediate part, than a smaller object with a larger surface to volume ratio. That stated, time frames for heating the patterned layers can be from about 10 minutes to about 8 hours, or from about 30 minutes to about 3 hours.

The 3D intermediate part 30, in this example, includes a 3D object formed of cured/solidified 3D intermediate part layers, which include both build material particles 22 and a network of polymeric particles holding the build material particles 22 together. The 3D intermediate part 30 that is formed is stable enough to be moved to an oven (or other heating device) suitable for de-binding and sintering e.g., annealing, melting, fusing, or the like.

In one example, the heating can be at a temperature ranging from about 500° C. to about 3,500° C. At lower temperatures within the range, the network of the polymer particles can thermally degrade, thereby debinding the 3D intermediate part 30, and at the higher temperatures within the range, the build material particles 22 are sintered together. In another example, the de-binding and sintering temperatures can be in the range of from about 600° C. to about 1,500° C., or from about 800° C. to about 1,200° C. The de-binding temperature range can vary, depending on the composition of the network. The sintering temperature range can vary, depending on the build material particles 22. In one example, the sintering temperature can range from about 10° C. below the melting temperature of the build material particles 22 to about 50° C. below the melting temperature of the build material particles 22. In another example, the sintering temperature can range from about 100° C. below the melting temperature of the build material particles 22 to about 200° C. below the melting temperature of the build material particles 22. The sintering temperature can also depend upon the particle size and period of time that heating occurs, e.g., at a high temperature for a sufficient time to cause particle surfaces to become physically merged or composited together. For example, a sintering temperature for stainless steel can be about 1,400° C. and an example of a sintering temperature for aluminum or aluminum alloys can range from about 550° C. to about 620° C. Temperatures outside of these ranges can be used as determined on a case by case basis.

When the build material particles 22 include metal particles, the heating device can include an inert or low-reactivity atmosphere to avoid oxidation of the metal particles. In one example, the inert or low-reactivity atmosphere can be oxygen-free and can include a noble gas, an inert gas, a low-reactivity gas, or combination thereof. For example, the inert or low-reactivity atmosphere can include a noble gas, an inert gas, or low-reactivity gas selected from argon, nitrogen, helium, neon, krypton, xenon, radon, hydrogen, or a combination thereof. Upon removal of the sintered 3D object from the oven and cooling (or annealing by controlling the cool down rate in the oven), the sintered 3D object can be treated or polished, such as by sand blasting, bead blasting, air jetting, tumble finishing such as barrel finishing, vibratory finishing, or a combination thereof. Tumble or vibratory finishing techniques can be performed wet (involving liquid lubricants, cleaners, or abrasives) or dry.

Printing with Masking Agents

Referring now to FIG. 7, in examples of the method 200 disclosed herein, after the build material layer 10 is formed, a masking agent 36N, 36P is selectively applied on at least a portion 34 of the build material layer 10, and the build material layer 10 is exposed to radiated energy. When a positive masking agent 36P is used, the patterned region 34 of the build material layer 10 is sintered or fused to become a layer 40 of a 3D object. When a negative masking agent 36N is used, the non-patterned region 38 of the build material layer 10 is sintered or fused to become a layer 40' of a 3D object. In either of these examples, the formation, patterning, and exposing of build material layers 10 to radiation may be repeated to form the 3D object.

Examples of the method 200 may be used when the build material particles 22 include polymer particles, ceramic particles, metal particles, or a combination thereof.

Positive Masking Agents

As mentioned above, the positive masking agent 36P may be selectively applied on at least a portion 34 of a build material layer 10. In these examples, the positive masking agent 36P may absorb radiation to which the build material layer 10 is exposed and cause the build material particles 22 in the at least portion 34 to sinter or fuse.

In some examples of the method 200, the positive masking agent 36P consists of a liquid vehicle and an energy absorber. In other examples, the positive masking agent may include other components.

Energy Absorber

The energy absorber is capable of absorbing radiated energy and converting the absorbed radiated energy to thermal energy. The thermal energy sufficiently raises the temperature of the build material particles 22 that are in contact with the energy absorber so that those build material particles 22 sinter or fuse to become a layer 40 of a 3D object, while the build material particles 22 that are not in contact with the energy absorber do not sinter or fuse. The energy absorber used may depend, at least in part, on the build material particles 22 used.

As used herein "absorption" means that at least 80% of radiation having wavelengths within the specified range is absorbed. Also as used herein, "transparency" means that 25% or less of radiation having wavelengths within the specified range is absorbed.

In some examples, the energy absorber may be an infrared light absorbing colorant. In an example, the energy absorber is a near-infrared light absorber. Any near-infrared colorants, e.g., those produced by Fabricolor, Eastman Kodak, or BASF, Yamamoto, may be used in the positive masking agent 36P. As one example, the positive masking agent 36P may be a printing liquid formulation including carbon black as the energy absorber. Examples of this printing liquid formulation are commercially known as CM997A, 516458, C18928, C93848, C93808, or the like, all of which are available from HP Inc.

As another example, the positive masking agent 36P may be a printing liquid formulation including near-infrared absorbing dyes as the energy absorber. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

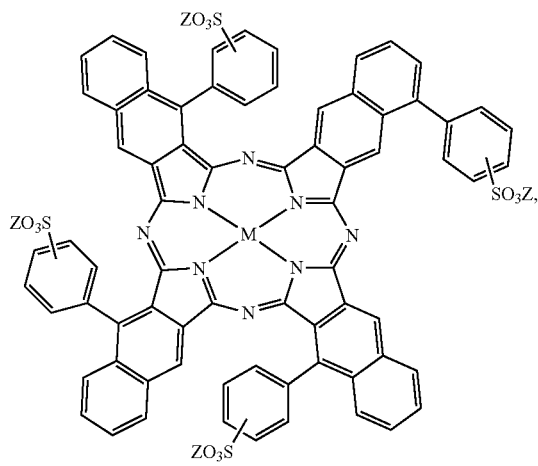

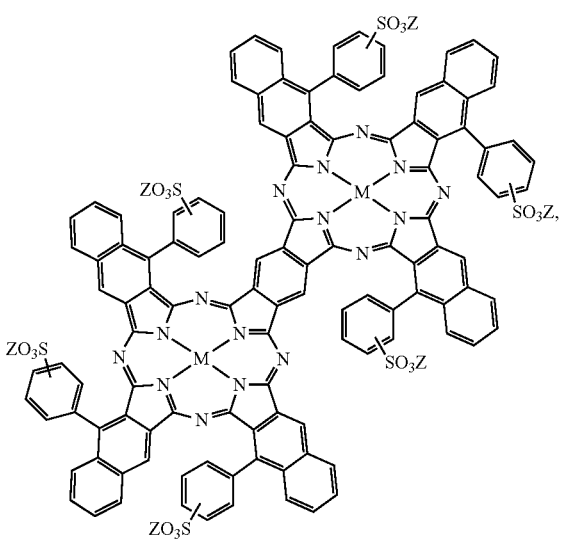

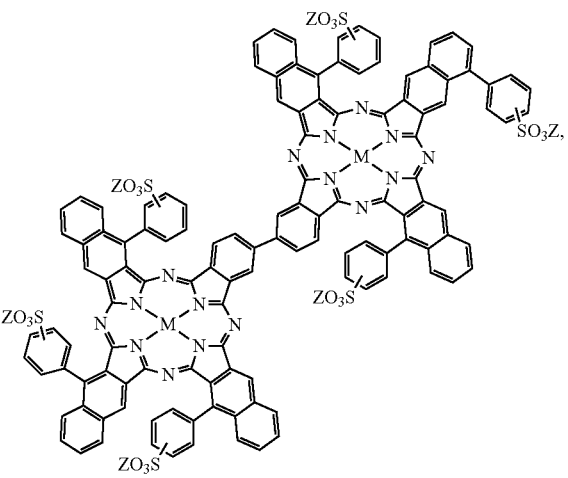

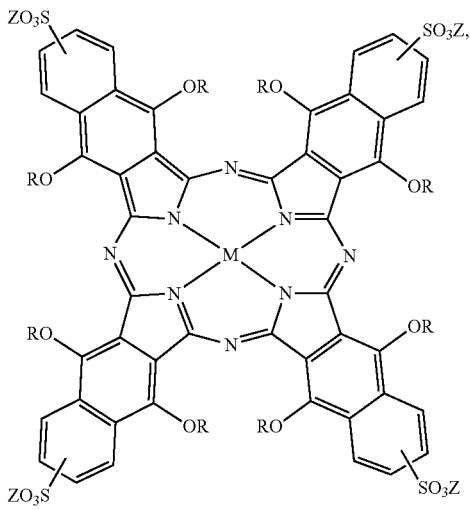

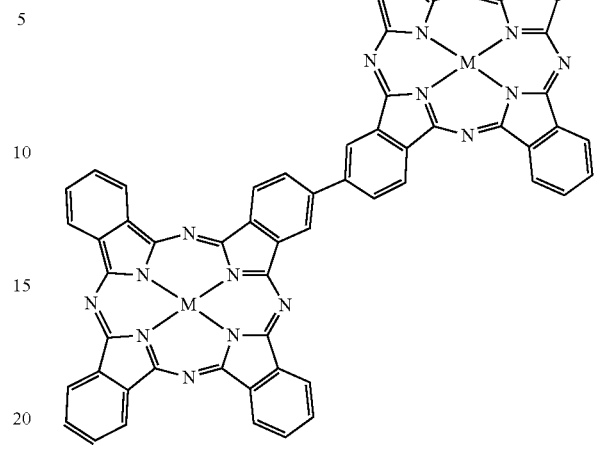

and mixtures thereof. In the above structures, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

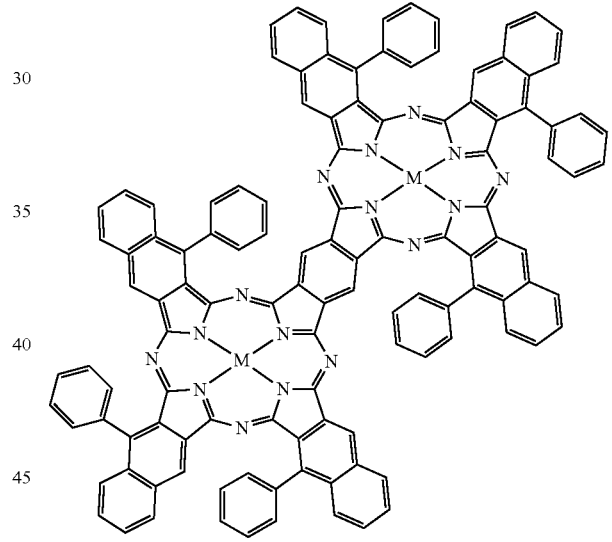

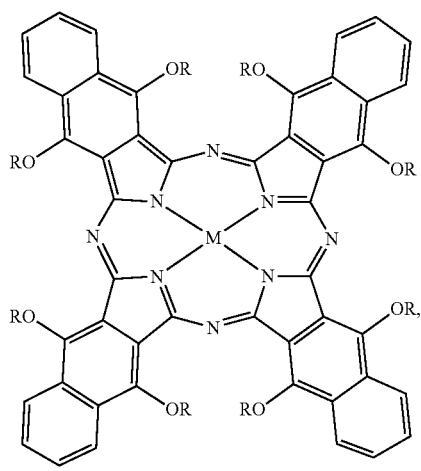

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

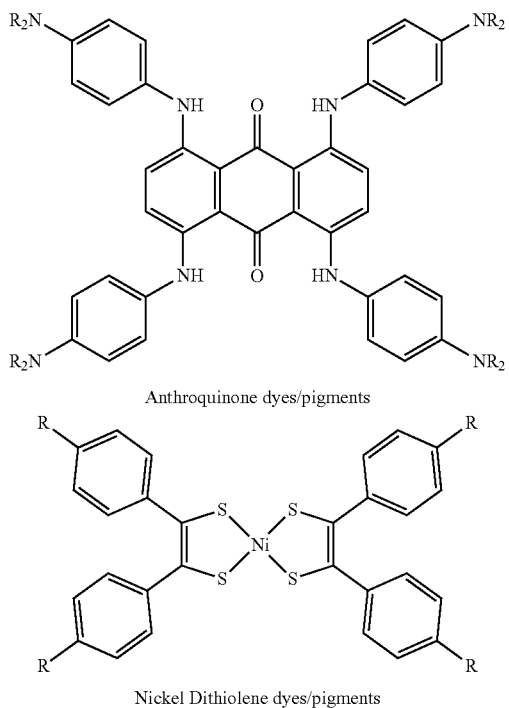

Anthroquinone dyes/pigments

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

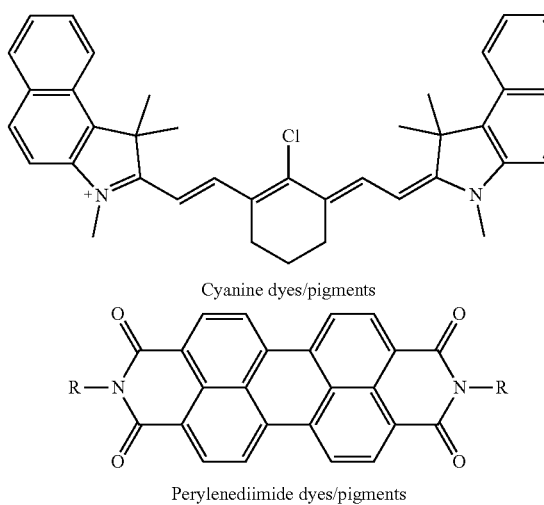

Cyanine dyes/pigments

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

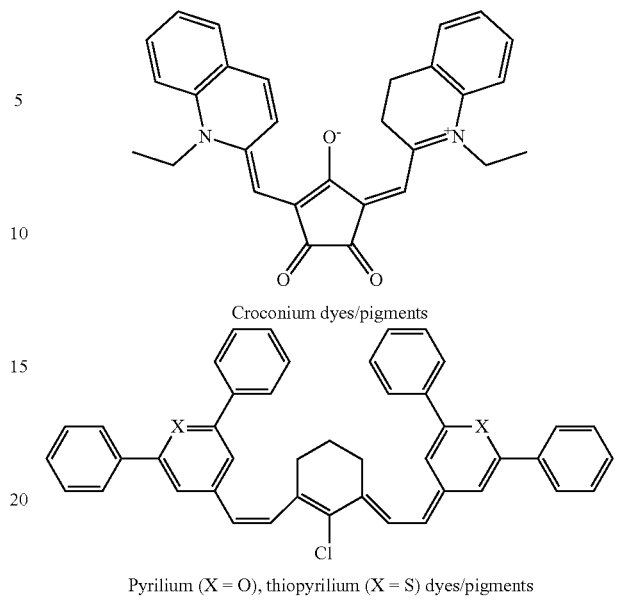

Croconium dyes/pigments

Pyrilium (X = O), thiopyrilium (X = S) dyes/pigments

Boron-dipyrromethene dyes or pigments and aza-boron-dipyrromethene dyes or pigments may have the following structures, respectively:

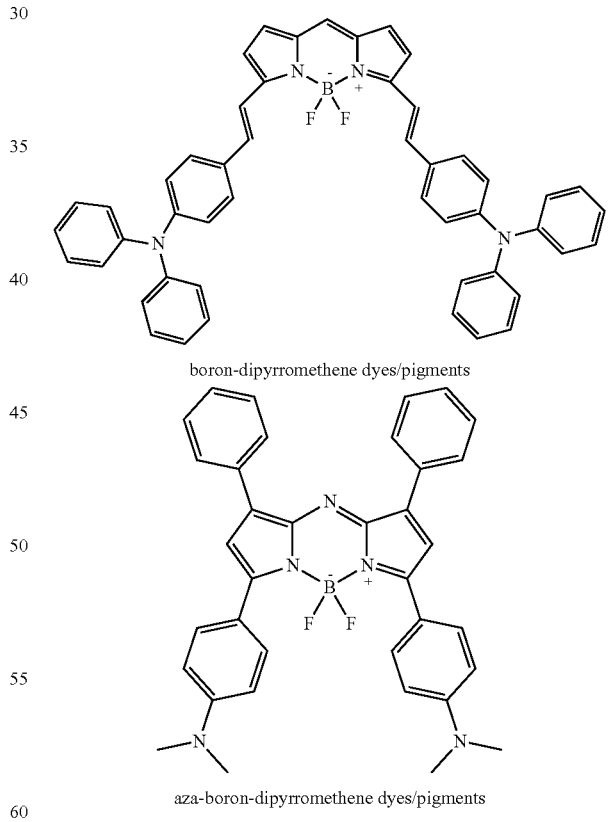

boron-dipyrromethene dyes/pigments aza-boron-dipyrromethene dyes/pigments

In other examples, the energy absorber may have absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the positive masking agent to be inkjet jettable as well as electromagnetically selective (e.g., having absorption at wavelengths ranging from 800 nm to 4000 nm and transparency at wavelengths ranging from 400 nm to 780 nm).

In an example, this energy absorber has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, this energy absorber is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), antimony tin oxide ($Sb_2O_3:SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

It is to be understood that the examples of the energy absorber provided are some examples, and that other energy absorbers may be used.

The amount of the energy absorber that is present in the positive masking agent 36P ranges from greater than 0 wt % active to about 40 wt % active based on the total weight of the positive masking agent 36P. In other examples, the amount of the energy absorber in the positive masking agent 36P ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy absorber loadings provide a balance between the positive masking agent 36P having jetting reliability and heat and/or radiation absorbance efficiency.

PMA Vehicles

In addition to the energy absorber, the positive masking agent 36P may also include a liquid vehicle (i.e., a PMA vehicle) in which the energy absorber is dispersed or dissolved to form the positive masking agent 36P.

In some examples, the PMA vehicle may make up about 60 wt % to about 99 wt % of the positive masking agent 36P. In other examples, the PMA vehicle may be included in the positive masking agent 36P in an amount ranging from about 60 wt % to about 95 wt %, from about 60 wt % to about 90 wt %, from about 60 wt % to about 85 wt %, from about 60 wt % to about 80 wt %, from about 75 wt % to about 90 wt %, or from about 70 wt % to about 80 wt %, based on a total weight of the positive masking agent 36P.

The solvent of the positive masking agent 36P may be water or a non-aqueous solvent (e.g., ethanol, acetone, n-methyl pyrrolidone, aliphatic hydrocarbons, etc.). In some examples, the positive masking agent 36P consists of the energy absorber and the solvent (without other components). In these examples, the solvent makes up the balance of the positive masking agent 36P. In other examples, the PMA vehicle may include other components. Examples of other suitable positive masking agent components include dispersant(s), silane coupling agent(s), co-solvent(s), humectant(s), surfactant(s), antimicrobial agent(s), anti-kogation agent(s), chelating agent(s), viscosity modifier(s), pH adjuster(s), and the like.

In some examples, the PMA vehicle of the positive masking agent 36P may be similar to the liquid vehicle of the binder agent 28. As such, the PMA vehicle of the positive masking agent 36P may include any of the components described above in reference to the liquid vehicle of the binder agent 28 in any of the amount described above (with the amount(s) being based on the total weight of the positive masking agent 36P rather than the total weight of the binder agent 28).

When the energy absorber is an inorganic pigment (having absorption at wavelengths ranging from 800 nm to 4000 nm and transparency at wavelengths ranging from 400 nm to 780 nm), the PMA vehicle may also include dispersant(s) and/or silane coupling agent(s).

Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins. Whether a single dispersant is used or a combination of dispersants is used, the total amount of dispersant(s) in the positive masking agent 36P may range from about 10 wt % to about 200 wt % based on the weight of the energy absorber in the positive masking agent 36P.

A silane coupling agent may also be added to the positive masking agent 36P to help bond the organic and inorganic materials. Examples of suitable silane coupling agents include the SILQUEST® A series manufactured by Momentive. Whether a single silane coupling agent is used or a combination of silane coupling agents is used, the total amount of silane coupling agent(s) in the positive masking agent may range from about 0.1 wt % active to about 50 wt % active based on the weight of the energy absorber in the positive masking agent 36P. In other examples, the total amount of silane coupling agent(s) in the positive masking agent 36P ranges from about 1 wt % active to about 30 wt % active or from about 2.5 wt % active to about 25 wt % active, based on the weight of the energy absorber.

Printing Methods

In examples of the method 200, a build material layer 10 may be formed as described herein in reference to FIG. 5.

After the formation of the build material layer 10, and prior to further processing, the build material layer 10 may be exposed to pre-heating. In some of these examples, the heating to evaporate the liquid agent may also pre-heat the build material layer. As such, pre-heating may be accomplished in a manner similar to the heating to evaporate the liquid agent 24 described above.

After the build material layer 10 is formed, and in some instances is pre-heated, the positive masking agent 36P is selectively applied on at least a portion 34 of the build material layer 10. In some examples of the method 200 disclosed herein, prior to the selectively applying of the masking agent (e.g., 36P), the build material layer has a substantially uniform thickness ranging from about 1 µm to about 200 µm.

The volume of the positive masking agent 36P that is applied per unit of the build material particles 22 in the patterned portion 34 may be sufficient to absorb and convert enough radiated energy so that the build material particles 22 in the patterned portion 34 will sinter or fuse. The volume of the positive masking agent 36P that is applied per unit of the build material particles 22 may depend, at least in part, on the energy absorber used, the energy absorber loading in the positive masking agent 36P, and the build material particles 22 used.

The positive masking agent 36P may be dispensed from an applicator 32. The applicator 32 may be a thermal inkjet printhead, a piezoelectric printhead, a continuous inkjet printhead, etc., and the selective application of the positive masking agent 36P may be accomplished by thermal inkjet printing, piezo electric inkjet printing, continuous inkjet printing, etc.

After the positive masking agent 36P is selectively applied in the desired portion(s) 34 of the build material layer, the entire build material layer is exposed to radiated energy.

In some examples of the method 200, the exposing of the build material layer 10 to radiated energy is accomplished using a flood energy source selected from the group consisting of an infrared lamp, an array of infrared emitters, a pulse gas discharge lamp, an array of fiber lasers, a semiconductor laser, a gas laser, an array of the semiconductor lasers, or an array of the gas lasers. One specific example of the pulse gas discharge lamp is a xenon pulse lamp.

The length of time the radiated energy is applied for, or energy exposure time, may be dependent, for example, on one or more of: characteristics of the flood energy source; characteristics of the build material particles; and/or characteristics of the positive masking agent.

The positive masking agent 36P enhances the absorption of the radiated energy, converts the absorbed radiated energy to thermal energy, and promotes the transfer of the thermal heat to the build material particles 22 in contact therewith. In an example, the positive masking agent 36P sufficiently elevates the temperature of the build material particles 22 in contact therewith so that those build material particles 22 sinter or fuse. The application of the radiated energy forms a layer of the 3D object.

In some examples, the radiated energy has a wavelength ranging from 800 nm to 4000 nm, or from 800 nm to 1400 nm, or from 800 nm to 1200 nm. Radiated energy having wavelengths within the provided ranges may be absorbed (e.g., 80% or more of the applied radiation is absorbed) by the positive masking agent 36P and may heat the build material particles 22 in contact therewith, and may not be substantially absorbed (e.g., 25% or less of the applied radiation is absorbed) by the non-patterned build material particles 22.

Additional layer(s) may be formed on the 3D object layer 40 to create the 3D object. To form the next 3D object layer, an additional build material layer may be formed as described above. The positive masking agent 36P is then selectively applied on at least a portion of the additional build material layer, according to the 3D object model. Then, the entire additional build material layer is exposed to radiated energy in the manner described herein. The formation of an additional build material layer, the selective application of the positive masking agent 36P, and the radiated energy exposure may be repeated a predetermined number of cycles to form the final 3D object in accordance with the 3D object model.

Negative Masking Agents

In another example of the method 200, a negative masking agent 36N is used instead of the positive masking agent 36P. The negative masking agent 36N may be selectively applied on at least a portion 34 of a build material layer 10. In these examples, the negative masking agent 36N may reflect radiation to which the build material layer 10 is exposed and prevent the build material particles 22 in the portion(s) 34 from sintering or fusing, while the build material particles 22 that are not in contact with the negative masking agent 36N sinter or fuse to form the layer 40'.

In some examples of the method 200, the negative masking agent 36N consists of a liquid vehicle and an energy reflector. In other examples, the negative masking agent 36N may include other components.

Energy Reflector

The energy reflector is capable of reflecting radiated energy so that the build material particles 22 that are in contact with the energy reflector do not sinter or fuse, while the radiated energy sufficiently raises the temperature of the build material particles 22 that are not underneath the energy reflector so that those build material particles 22 sinter or fuse to become a layer of a 3D object 40'. The energy reflector used may depend, at least in part, on the build material particles 22 used.

In some examples, the energy reflector may be a white material, such as titanium dioxide particles ($TiO_2$) or alumina ($Al_2O_3$). In other examples the energy reflector may be a metallic material, such as silver.

It is to be understood that the examples of the energy reflector provided are some examples, and that other energy reflectors may be used.

The amount of the energy reflector that is present in the negative masking agent 36N ranges from greater than 0 wt % active to about 40 wt % active based on the total weight of the negative masking agent. In other examples, the amount of the energy reflector in the negative masking agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy reflector loadings provide a balance between the negative masking agent 36N having jetting reliability and heat and/or radiation reflection efficiency.

NMA Vehicles

In addition to the energy reflector, the negative masking agent 36N may also include a liquid vehicle (i.e., a NMA vehicle) in which the energy reflector is dispersed or dissolved to form the negative masking agent 36N.

In some examples, the NMA vehicle may make up about 60 wt % to about 99 wt % of the negative masking agent 36N. In other examples, the NMA vehicle may be included in the negative masking agent 36N in an amount ranging from about 60 wt % to about 95 wt %, from about 60 wt % to about 90 wt %, from about 60 wt % to about 85 wt %, from about 60 wt % to about 80 wt %, from about 75 wt % to about 90 wt %, or from about 70 wt % to about 80 wt %, based on a total weight of the negative masking agent 36N.

The solvent of the negative masking agent 36N may be water or a non-aqueous solvent (e.g., ethanol, acetone, n-methyl pyrrolidone, aliphatic hydrocarbons, etc.). In some examples, the negative masking agent consists of the energy reflector and the solvent (without other components). In these examples, the solvent makes up the balance of the negative masking agent 36N. In other examples, the NMA vehicle may include other components. Examples of other suitable negative masking agent 36N components include dispersant(s), co-solvent(s), humectant(s), surfactant(s), antimicrobial agent(s), anti-kogation agent(s), chelating agent(s), viscosity modifier(s), pH adjuster(s), and the like.

In some examples, the NMA vehicle of the negative masking agent 36N may be similar to the PMA vehicle of the positive masking agent 36P and/or the liquid vehicle of the binder agent 28. As such, the NMA vehicle of the negative masking agent 36N may include any of the components described above in reference to the PMA vehicle of the positive masking agent 36P or the liquid vehicle of the binder agent 28 in any of the amount described above (with the amount(s) being based on the total weight of the negative masking agent 36N rather than the total weight of the positive masking agent 36P or the binder agent 28).

Printing Methods

In examples of the method 200, a build material layer 10 may be formed as described herein in reference to FIG. 5.

After the formation of the build material layer 10, and prior to further processing, the build material layer 10 may be exposed to pre-heating as described above.

After the build material layer 10 is formed, and in some instances is pre-heated, the negative masking agent 36N is selectively applied on at least a portion 34 of the build material layer 10.

The volume of the negative masking agent 36N that is applied per unit of the build material particles 22 in the patterned portion 34 may be sufficient to reflect enough radiated energy so that the build material particles 22 in the patterned portion 34 do not sinter or fuse. The volume of the negative masking agent 36N that is applied per unit of the build material particles 22 may depend, at least in part, on the energy reflector used, the energy reflector loading in the negative masking agent 36N, and the build material particles 22 used.

The negative masking agent 36N may be dispensed from an applicator 32. The applicator 32 may be a thermal inkjet printhead, a piezoelectric printhead, a continuous inkjet printhead, etc., and the selective application of the negative masking agent may be accomplished by thermal inkjet printing, piezo electric inkjet printing, continuous inkjet printing, etc.

After the negative masking agent 36N is selectively applied in the desired portion(s) 34 of the build material layer 10, the entire build material layer is exposed to radiated energy.

In some examples of the method 200, the exposing of the build material layer 10 to radiated energy is accomplished using a flood energy source selected from the group consisting of an infrared lamp, an array of infrared emitters, a pulse gas discharge lamp, an array of fiber lasers, a semiconductor laser, a gas laser, an array of the semiconductor lasers, or an array of the gas lasers. One specific example of the pulse gas discharge lamp is a xenon pulse lamp.

The length of time the radiated energy is applied for, or energy exposure time, may be dependent, for example, on one or more of: characteristics of the flood energy source; characteristics of the build material particles; and/or characteristics of the negative masking agent 36N.

The negative masking agent 36N reflects the radiated energy and prevents the build material particles 22 from absorbing enough of the radiated energy to sinter or fuse. The non-patterned build material particles (e.g., in portion 38) absorb the radiated energy and convert the absorbed radiated energy to thermal energy. In an example, the non-patterned build material particles 22 absorb enough radiated energy to sufficiently elevate the temperature of the non-patterned build material particles 22 so that they sinter or fuse. The application of the radiated energy forms a layer 40' of the 3D object.

In some examples, the radiated energy has a wavelength ranging from 800 nm to 4000 nm, or from 800 nm to 1400 nm, or from 800 nm to 1200 nm. Radiated energy having wavelengths within the provided ranges may be reflected by the negative masking agent 36N.

Additional layer(s) may be formed on the 3D object layer 40' to create the 3D object. To form the next 3D object layer, an additional build material layer may be formed as described above. The negative masking agent 36N is then selectively applied on at least a portion of the additional build material layer, according to the 3D object model. Then, the entire additional build material layer is exposed to radiated energy in the manner described herein. The formation of an additional build material layer, the selective application of the negative masking agent 36N, and the radiated energy exposure may be repeated a predetermined number of cycles to form the final 3D object in accordance with the 3D object model.

Printing Using SLS/SLM

Figure 8:
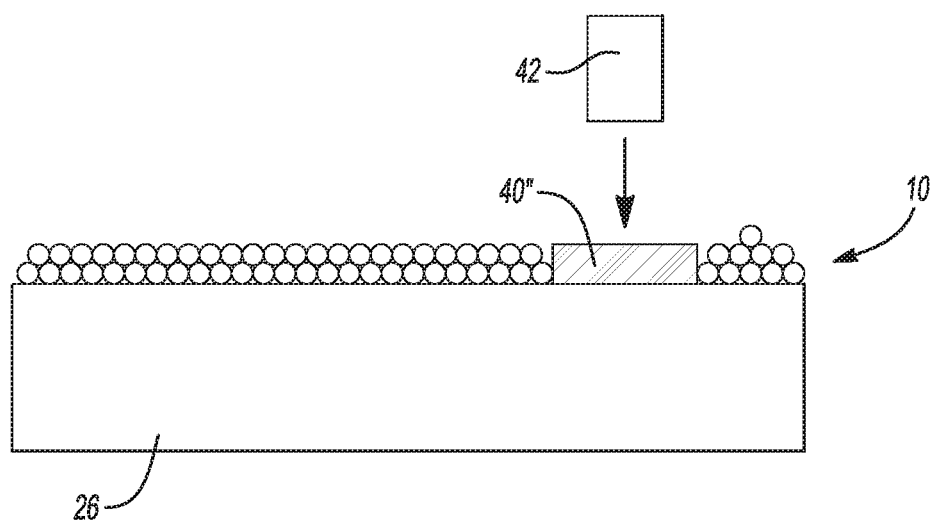
FIG. 8 is a schematic illustration of a 3D printing method using a laser beam.

Referring now to FIG. 8, in examples of the method 300 disclosed herein, after the build material layer 10 is formed, at least a portion of the build material layer 10 is exposed to a laser. In these examples, the layers of the 3D object are formed via selective laser sintering (SLS) or selective laser melting (SLM).

Examples of the method 300 may be used when the build material particles include polymer particles, ceramic particles, metal particles, or a combination thereof.

In these examples, no binder agent 28 or masking agent 36P, 36N is applied on the build material particles 22. Rather, an energy beam 42 is used to selectively apply radiation to the portions of the build material layer that are to sinter or fuse to become part of the 3D object.

In this example, the source of electromagnetic radiation may be a laser or other tightly focused energy source that may selectively apply radiation to the build material layer. The laser may emit light through optical amplification based on the stimulated emission of radiation. The laser may emit light coherently (i.e., constant phase difference and frequency), which allows the radiation to be emitted in the form of a laser beam that stays narrow over large distances and focuses on a small area. In some examples, the laser or other tightly focused energy source may be a pulse laser (i.e., the optical power appears in pluses). Using a pulse laser allows energy to build between pluses, which enable the beam to have more energy. A single laser or multiple lasers may be used.

In any of the methods 100, 200, 300 disclosed herein, differently shaped objects may be printed in different orientations within the printing system. As such, while the object may be printed from the bottom of the object to the top of the object, it may alternatively be printed starting with the top of the object to the bottom of the object, or from a side of the object to another side of the object, or at any other orientation that is suitable or desired for the particular geometry of the part being formed.

To further illustrate the present disclosure, examples are given herein. It is to be understood that these examples are provided for illustrative purposes and are not to be construed as limiting the scope of the present disclosure.

EXAMPLES

Example 1

Several examples of the dispersion disclosed herein were prepared. Each example dispersion included stainless steel particles (having a D50 particle size less than 25 μm) as the build material particles. Up to 50 vol % loadings were used for the build material particles. Each example dispersion also included either isopropanol as the liquid agent or a 50:50 mixture by volume of isopropanol and water as the liquid agent.

Each of the example dispersions was successfully sprayed using a handheld pump spray bottle. Some of the example dispersions were frequently shaken prior to successful spraying. The example liquid agents quickly (in about 1.0 second or less) evaporated from the layers to form example build material layers.

One of the example build material layers was formed with a dispersion that included isopropanol and 50 vol % stainless steel particles. This example build material layer was about 30 μm thick and was deposited on a glass substrate. The glass substrate with the example build material layer thereon was rotated and shaken. The rotating and shaking had no effect on the build material particles, which remained well adhered to the glass substrate. The layer was also scratched to test adhesion, and some scratches did result. Overall, the results indicated that the molecular and electrostatic attractive interactions between sprayed particles were strong enough to support a large scale deposition process.

Example 2

Two example partially sintered (fused) layers were manufactured using one of the example dispersions (including isopropanol and 50 vol % stainless steel particles from Example 1). Both of the example partially sintered layers were fabricated on respective glass substrates with a single spraying pass of the handheld pump spray bottle and a single irradiation pulse from a xenon pulse lamp. The single irradiation pulse was performed to achieve partial sintering so that the layers could be removed from the glass substrates, handled, and analyzed with scanning electron microscopy (SEM). The irradiation pulse used to form the first partially sintered layer had a dose (i.e., total energy per area (e.g., Joules per square centimeter ($J/cm^2$)) of the radiated energy) of about 22 $J/cm^2$, and the irradiation pulse used to form the second partially sintered layer had a dose of about 24.4 $J/cm^2$.

Figure 9A:
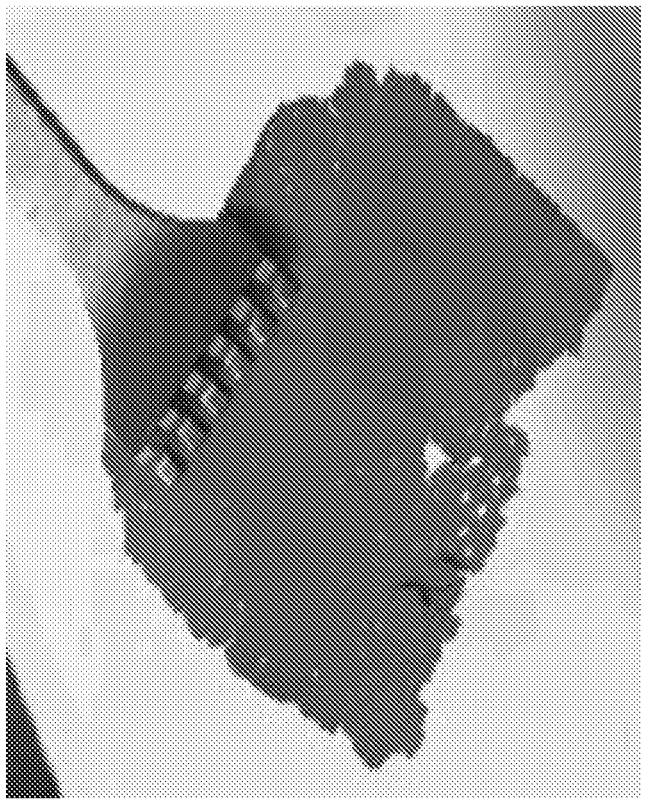
FIG. 9A is a black and white photograph of a partially sintered layer after it was lifted from a glass substrate.
Figure 9B:
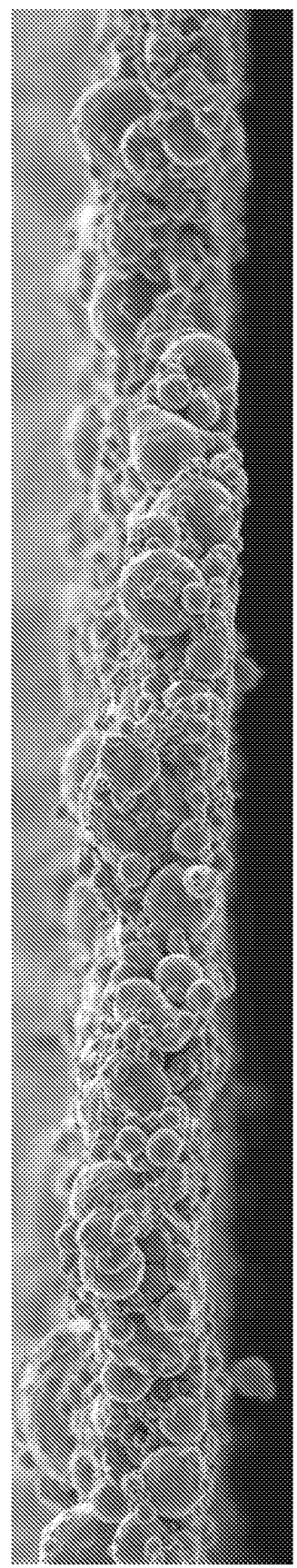
FIG. 9B is a scanning electron microscopy (SEM) image of a cross-section of the partially sintered layer of FIG. 9A.

The first partially sintered layer is shown in FIGS. 9A and 9B. In FIG. 9A, the first partially sintered layer had been lifted from the glass substrate. FIG. 9B depicts the SEM image (with a 20 μm scale bar) of a cross-section of the first partially sintered layer. FIG. 9B illustrates that the layer was relatively uniform in thickness and that the particles had started to sinter together.

Figure 10A:
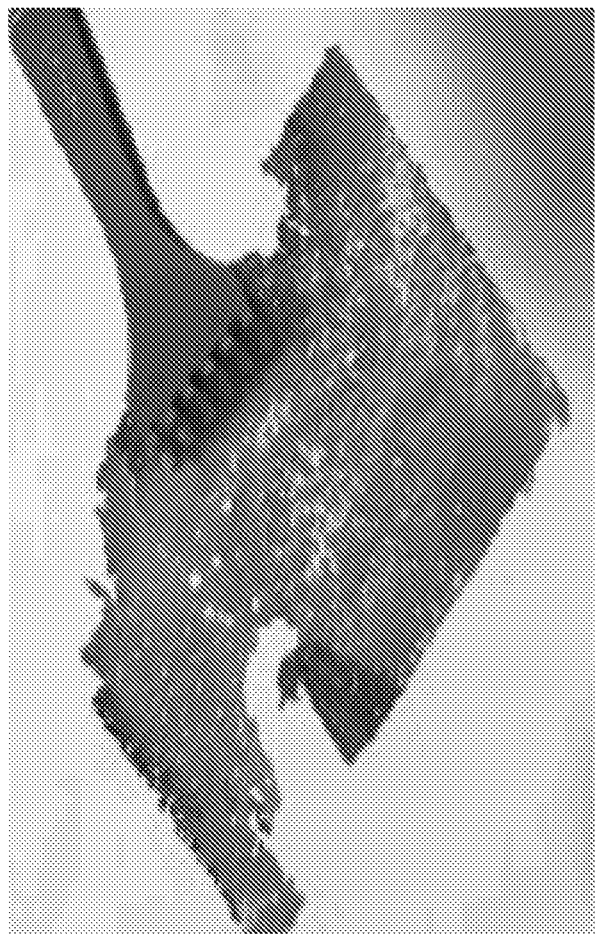
FIG. 10A is a black and white photograph of another partially sintered layer after it was lifted from a glass substrate.
Figure 10B:
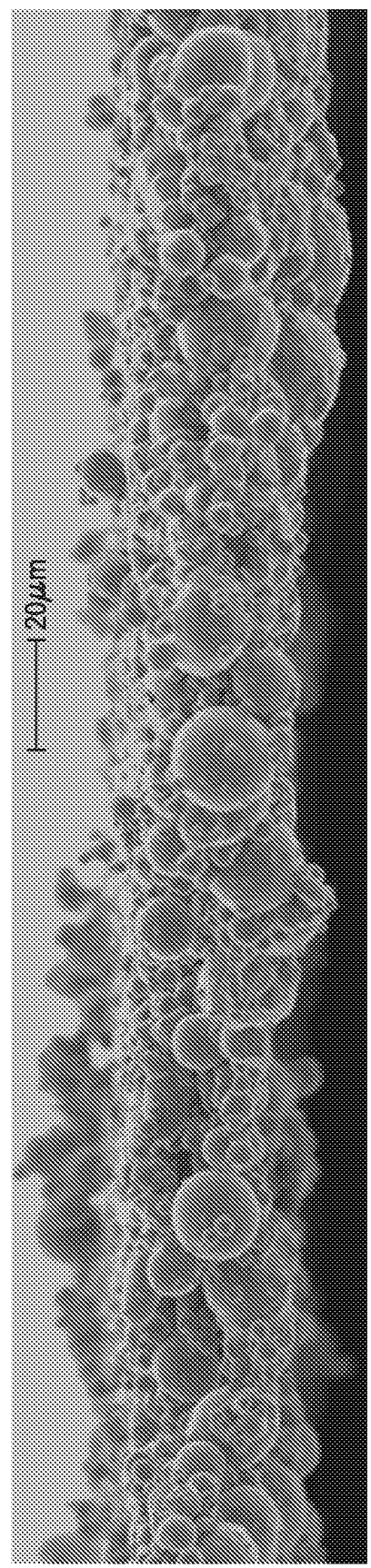
FIG. 10B is a SEM image of a cross-section of the partially sintered layer of FIG. 10A.

The second partially sintered layer is shown in FIGS. 10A and 10B. In FIG. 10A, the second partially sintered layer had been lifted from the glass substrate FIG. 10B depicts the SEM image (with a 20 μm scale bar) of a cross-section of the second partially sintered layer. FIG. 10B illustrates that the layer was relatively uniform in thickness and that the particles had started to sinter together.

Four additional example partially sintered layers were manufactured using the example dispersion. Each of the additional example partially sintered layers was fabricated on a respective glass substrate with a single spraying pass of the handheld pump spray bottle and a single irradiation pulse (with an energy exposure (dose) of about 19.7 $J/cm^2$) from the xenon pulse lamp. The four additional example partially sintered layers had thicknesses of about 20.8 μm, about 24.7 μm, about 26.6 μm, and about 24.9 μm (respectively). These results indicate excellent spraying reproducibility.

Several more partially sintered layers were manufactured using the example dispersion. Each of the additional example partially sintered layers was fabricated on a glass substrate with 1, 2, 3, or 4 spraying pass(es) of the handheld pump spray bottle and an irradiation pulse at a dose of about 19.7 $J/cm^2$, about 22.0 $J/cm^2$, about 24.4 $J/cm^2$, or about 26.9 $J/cm^2$, from the xenon pulse lamp.

The thicknesses, in μm, of the additional example partially sintered layers are shown in Table 2. The additional example partially sintered layers are identified in Table 2 by the number of spraying pass(es) and the dose of the irradiation pulse used to create the partially sintered layers.

TABLE 2

|  | 1 spraying pass | 2 spraying passes | 3 spraying passes | 4 spraying passes |
| --- | --- | --- | --- | --- |
| Dose of ~19.7 $J/cm^2$ | ~21 μm | — | — | — |
| Dose of ~22.0 $J/cm^2$ | ~26 μm | ~32 μm | ~38 μm | ~37 μm |
| Dose of ~24.4 $J/cm^2$ | ~25 μm | ~34 μm | ~36 μm | ~35 μm |
| Dose of ~26.9 $J/cm^2$ | — | ~37 μm | ~33 μm | ~29 μm |

As shown in Table 2, multiple spraying passes increased the thickness of the partially sintered layers. However, due to the inability of the radiated energy (from the xenon pulse lamp) to penetrate past a thickness of about 38 μm, the thickness of the partially sintered layers produced using multiple spraying passes ranged from about 30 μm to about 38 μm. It is to be understood, however, that full 3D printed parts may be formed using any of the example 3D printing methods disclosed herein.

Example 3

Four example partially sintered 3D objects were manufactured using the example dispersion (including isopropanol and 50 vol % stainless steel particles from Example 1 and Example 2). Each example partially sintered 3D object was fabricated on a glass substrate by spraying a layer in a single pass, exposing the layer to an irradiation pulse, and repeating the spraying and the exposing. Each example 3D object had 4 partially sintered sintered layers.

The thickness of the example 3D objects increased with each layer added. Further, the average layer thickness was reproducible. The four example partially sintered 3D objects had total thicknesses (including all 4 layers) of about 112 µm, about 111 µm, about 109 µm, and about 104 µm (respectively).

Figure 11:
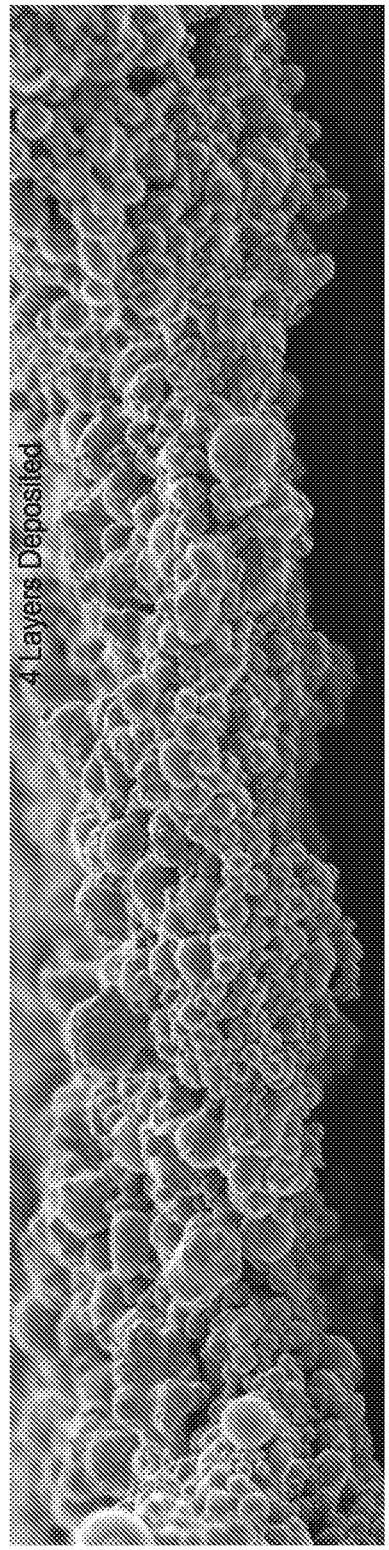
FIG. 11 is a SEM image of a cross-section of a multi-layered, partially sintered structure formed via spraying and flash fusing.

One of the example partially sintered 3D objects formed is shown in FIG. 11. In FIG. 11, a cross-section of the example partially sintered 3D object is shown in a SEM image, with a 50 µm scale bar.

It is to be understood that the ranges provided herein include the stated range and any value or sub-range within the stated range, as if such values or sub-ranges were explicitly recited. For example, from about 0.1 mPa·sec to about 50 mPa·sec should be interpreted to include not only the explicitly recited limits of from about 0.1 mPa·sec to about 50 mPa·sec, but also to include individual values, such as about 0.5 mPa·sec, about 9.75 mPa·sec, about 24.67 mPa·sec, about 47.0 mPa·sec, etc., and sub-ranges, such as from about 6.53 mPa·sec to about 36.5 mPa·sec, from about 10.25 mPa·sec to about 42.2 mPa·sec, from about 18.75 mPa·sec to about 47.79 mPa·sec, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
    spraying one or more dispersions to form a layer including build material particles and a liquid agent;
    evaporating the liquid agent from the layer to form a build material layer;
    based on a 3D object model, selectively applying a masking agent on at least a portion of the build material layer; and
    exposing the build material layer to radiated energy;
    wherein the build material particles are selected from the group consisting of metal, ceramic, a mixture of two or more metals, a mixture of a metal and a ceramic, and combinations thereof;
    and wherein the build material particles have a D50 particle size distribution value ranging from about 15 µm to about 100 µm.

2. The method as defined in claim 1 wherein one of the one or more dispersions includes at least some of the liquid agent and at least some of the build material particles, and has a viscosity ranging from about 0.1 mPa·sec to about 50 mPa·sec.

3. The method as defined in claim 1 wherein, prior to the selectively applying of the masking agent, the build material layer has a substantially uniform thickness ranging from about 1 µm to about 200 µm.

4. The method as defined in claim 1, further comprising agitating the one or more dispersions prior to the spraying of the one or more dispersions.

5. The method as defined in claim 1 wherein the exposing of the build material layer to radiated energy is accomplished using a flood energy source selected from the group consisting of an infrared lamp, an array of infrared emitters, a pulse gas discharge lamp, an array of fiber lasers, a semiconductor laser, a gas laser, an array of the semiconductor lasers, or an array of the gas lasers.

6. The method as defined in claim 1 wherein the build material particles have a D50 particle size distribution value ranging from about 25 µm to about 100 µm.

* * * * *